United States Patent
Yi et al.

(10) Patent No.: US 10,917,929 B2
(45) Date of Patent: *Feb. 9, 2021

(54) METHOD FOR INDICATING A CIPHERING INDICATION FOR A SIDELINK RADIO BEARER IN A D2D COMMUNICATION SYSTEM AND DEVICE THEREFOR

(71) Applicant: LG ELECTRONICS INC., Seoul (KR)

(72) Inventors: Seungjune Yi, Seoul (KR); Sunyoung Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 16/212,279

(22) Filed: Dec. 6, 2018

(65) Prior Publication Data
US 2019/0110327 A1    Apr. 11, 2019

Related U.S. Application Data

(63) Continuation of application No. 15/684,146, filed on Aug. 23, 2017, now Pat. No. 10,187,909, which is a
(Continued)

(51) Int. Cl.
*H04W 76/14* (2018.01)
*H04W 12/08* (2009.01)
(Continued)

(52) U.S. Cl.
CPC ....... *H04W 76/14* (2018.02); *H04W 12/0013* (2019.01); *H04W 12/02* (2013.01); *H04W 92/18* (2013.01)

(58) Field of Classification Search
None
See application file for complete search history.

(56) References Cited

U.S. PATENT DOCUMENTS 8,352,838 B2 * 1/2013 Komatsu ............... H04L 1/1642
  714/776
8,958,422 B2 * 2/2015 Celik .................... H04L 1/1841
  370/389
(Continued)

FOREIGN PATENT DOCUMENTS

CN    101636939    1/2010
CN    102265701    11/2011
(Continued)

OTHER PUBLICATIONS

Intel Corporation, "Discussion on physical structure of D2D data channel and PDU mapping," 3GPP TSG RAN WG1 Meeting #78, R1-143277, Aug. 2014, 8 pages.
(Continued)

*Primary Examiner* — Hong S Cho
(74) *Attorney, Agent, or Firm* — Lee Hong Degerman Kang Waimey

(57) ABSTRACT

The present invention relates to a wireless communication system. More specifically, the present invention relates to a method and a device for indicating a ciphering indication for a sidelink radio bearer in a D2D communication system, the method comprising: receiving a PDCP SDU when the UE is configured to communicate with one or more other UEs directly; deciding whether to apply ciphering or not for the received PDCP SDU; generating a PDCP data PDU including the received PDCP SDU and a PDCP PDU header including one or more fields for ciphering parameters; and transmitting the PDCP data PDU to the one or more other UEs over PC5 interface, wherein at least one of the one or more fields for ciphering parameters is set to a fixed value when the ciphering is not applied for the received PDCP SDU.

14 Claims, 21 Drawing Sheets

Related U.S. Application Data continuation of application No. 14/816,968, filed on Aug. 3, 2015, now Pat. No. 9,769,861.

(60) Provisional application No. 62/077,326, filed on Nov. 10, 2014.

(51) Int. Cl.
    *H04W 28/06*     (2009.01)
    *H04W 12/00*     (2021.01)
    *H04W 12/02*     (2009.01)
    *H04W 92/18*     (2009.01)

(56) References Cited

U.S. PATENT DOCUMENTS

| | | | |
|---|---|---|---|
| 9,124,425 B2* | 9/2015 | Kubota | H04L 9/12 |
| 9,813,550 B2* | 11/2017 | Kim | H04W 12/02 |
| 10,187,909 B2 | 1/2019 | Yi et al. | |
| 2002/0042270 A1* | 4/2002 | Yi | H04B 7/2603 |
| | | | 455/424 |
| 2009/0104890 A1* | 4/2009 | Wang | H04W 12/02 |
| | | | 455/410 |
| 2010/0020973 A1* | 1/2010 | Abe | H04W 12/02 |
| | | | 380/255 |
| 2010/0074222 A1* | 3/2010 | Wu | H04L 1/1874 |
| | | | 370/331 |
| 2010/0091709 A1* | 4/2010 | Yi | H04L 69/08 |
| | | | 370/328 |
| 2015/0124646 A1* | 5/2015 | Yun | H04L 67/1051 |
| | | | 370/254 |
| 2016/0127882 A1* | 5/2016 | Agiwal | H04L 9/0861 |
| | | | 713/150 |
| 2016/0135084 A1 | 5/2016 | Yi et al. | |
| 2017/0374699 A1 | 12/2017 | Yi et al. | |

FOREIGN PATENT DOCUMENTS

| | | |
|---|---|---|
| CN | 103249095 | 8/2013 |
| EP | 2640120 | 9/2013 |
| JP | 2010520698 | 6/2010 |
| WO | 2013/181421 | 12/2013 |
| WO | 2014/068464 | 5/2014 |

OTHER PUBLICATIONS

PCT International Application No. PCT/KR2015/007794, Written Opinion of the International Searching Authority dated Nov. 9, 2015, 11 pages.

European Patent Office Application Serial No. 15858757.6, Search Report dated May 11, 2018, 9 pages.

Ericsson, "Combined Radio Connection Change and Security", 3GPP TSG RAN WG2 Meeting #59, R2-073242, XP050135969, Aug. 2007, 2 pages.

"CR to 36.523-3: Add new verified and e-mail agreed TTCN test cases in the TC lists in 36.523-3 (prose), Annex A", 3GPP TSG RAN Meeting #64, RP-140823, XP050832510, Jun. 2014, 165 pages.

Samsung, "PDCP Header for PDCP PDUs caning unsecured PDCP SDUs", 3GPP TSG RAN WG2 Meeting #88, R2-144817, Nov. 2014, 2 pages.

The State Intellectual Property Office of the People's Republic of China Application Serial No. 201580053051.3, Office Action dated Oct. 31, 2019, 8 pages.

\* cited by examiner

FIG. 3
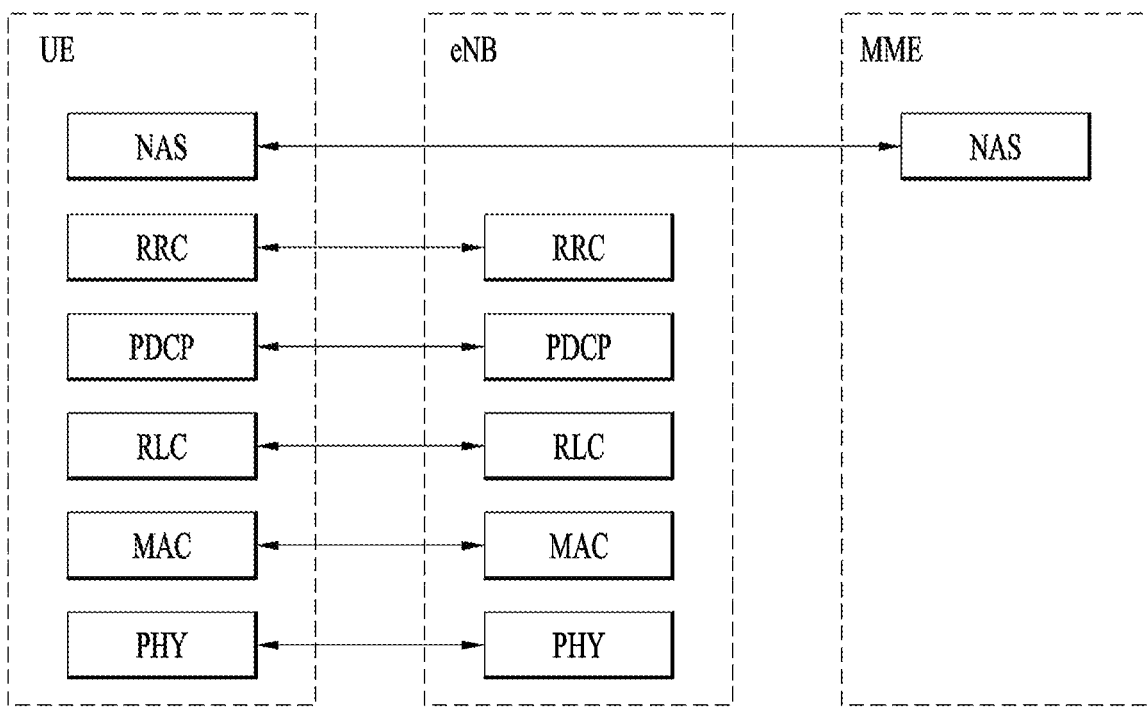
(a) Control-Plane Protocol Stack
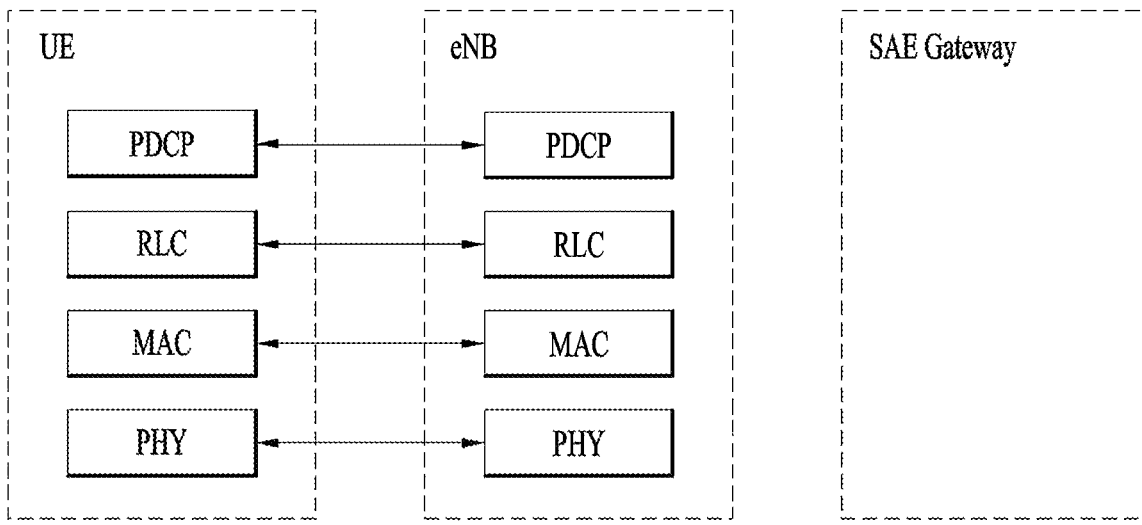
(b) User-Plane Protocol Stack

FIG. 17

| SDU Type | PGK Index | Oct 1 |
|---|---|---|
| PTK Identity | | Oct 2 |
| PTK Identity (cont.) | | Oct 3 |
| PDCP SN | | Oct 4 |
| PDCP SN (cont.) | | Oct 5 |
| Data | | Oct 6 |

| CIND | SDU Type | PGK Index | | Oct 1 |
| PTK Identity | | | | Oct 2 |
| PTK Identity (cont.) | | | | Oct 3 |
| PDCP SN | | | | Oct 4 |
| PDCP SN (cont.) | | | | Oct 5 |
| Data | | | | Oct 6 |

FIG. 19B

| CIND | SDU Type | Reserved | Oct 1 |
| Data | | | Oct 2 |

FIG. 20A

| SDU Type | PGK Index | Oct 1 |
|---|---|---|
| PTK Identity | | Oct 2 |
| PTK Identity (cont.) | | Oct 3 |
| PDCP SN | | Oct 4 |
| PDCP SN (cont.) | | Oct 5 |
| Data | | Oct 6 |

FIG. 20B

| SDU Type | Reserved | Oct 1 |
|---|---|---|
| Data | | Oct 2 |

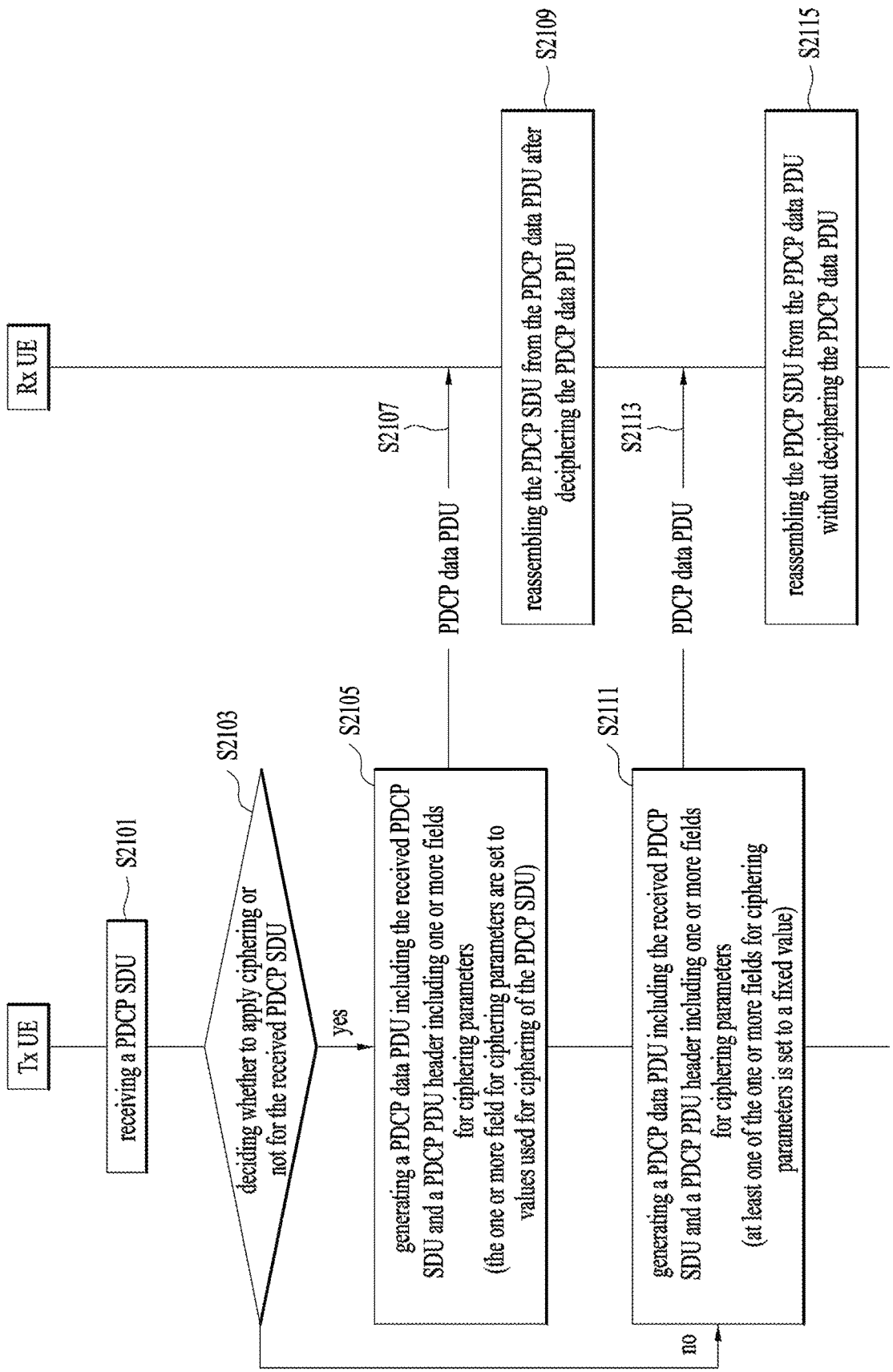

FIG. 22A

| SDU Type | PGK Index | Oct 1 |
|---|---|---|
| PTK Identity | | Oct 2 |
| PTK Identity (cont.) | | Oct 3 |
| PDCP SN | | Oct 4 |
| PDCP SN (cont.) | | Oct 5 |
| Data | | Oct 6 |

FIG. 22B

| SDU Type | | | | PGK Index | | | | Oct 1 |
|---|---|---|---|---|---|---|---|---|
| PTK Identity | | | | | | | | Oct 2 |
| PTK Identity (cont.) | | | | | | | | Oct 3 |
| 1 | 1 | 1 | 1 | 1 | 1 | 1 | 1 | Oct 4 |
| 1 | 1 | 1 | 1 | 1 | 1 | 1 | 1 | Oct 5 |
| Data | | | | | | | | Oct 6 |

METHOD FOR INDICATING A CIPHERING INDICATION FOR A SIDELINK RADIO BEARER IN A D2D COMMUNICATION SYSTEM AND DEVICE THEREFOR

CROSS-REFERENCE TO RELATED APPLICATIONS

This application is a continuation of U.S. patent application Ser. No. 15/684,146, filed on Aug. 23, 2017, now U.S. Pat. No. 10,187,909, which is a continuation of U.S. patent application Ser. No. 14/816,968, filed on Aug. 3, 2015, now U.S. Pat. No. 9,769,861, which claims the benefit of U.S. Provisional Patent Application No. 62/077,326, filed on Nov. 10, 2014, the contents of which are all hereby incorporated by reference herein in their entirety.

BACKGROUND OF THE INVENTION

Field of the Invention

The present invention relates to a wireless communication system and, more particularly, to a method for indicating a ciphering indication for a sidelink radio bearer in a D2D (Device to Device) communication system and a device therefor.

Discussion of the Related Art

As an example of a mobile communication system to which the present invention is applicable, a 3rd Generation Partnership Project Long Term Evolution (hereinafter, referred to as LTE) communication system is described in brief.

FIG. 1 is a view schematically illustrating a network structure of an E-UMTS as an exemplary radio communication system. An Evolved Universal Mobile Telecommunications System (E-UMTS) is an advanced version of a conventional Universal Mobile Telecommunications System (UMTS) and basic standardization thereof is currently underway in the 3GPP. E-UMTS may be generally referred to as a Long Term Evolution (LTE) system. For details of the technical specifications of the UMTS and E-UMTS, reference can be made to Release 7 and Release 8 of "3rd Generation Partnership Project; Technical Specification Group Radio Access Network".

Referring to FIG. 1, the E-UMTS includes a User Equipment (UE), eNode Bs (eNBs), and an Access Gateway (AG) which is located at an end of the network (E-UTRAN) and connected to an external network. The eNBs may simultaneously transmit multiple data streams for a broadcast service, a multicast service, and/or a unicast service.

One or more cells may exist per eNB. The cell is set to operate in one of bandwidths such as 1.25, 2.5, 5, 10, 15, and 20 MHz and provides a downlink (DL) or uplink (UL) transmission service to a plurality of UEs in the bandwidth. Different cells may be set to provide different bandwidths. The eNB controls data transmission or reception to and from a plurality of UEs. The eNB transmits DL scheduling information of DL data to a corresponding UE so as to inform the UE of a time/frequency domain in which the DL data is supposed to be transmitted, coding, a data size, and hybrid automatic repeat and request (HARQ)-related information. In addition, the eNB transmits UL scheduling information of UL data to a corresponding UE so as to inform the UE of a time/frequency domain which may be used by the UE, coding, a data size, and HARQ-related information. An interface for transmitting user traffic or control traffic may be used between eNBs. A core network (CN) may include the AG and a network node or the like for user registration of UEs. The AG manages the mobility of a UE on a tracking area (TA) basis. One TA includes a plurality of cells.

Device to device (D2D) communication refers to the distributed communication technology that directly transfers traffic between adjacent nodes without using infrastructure such as a base station. In a D2D communication environment, each node such as a portable terminal discovers user equipment physically adjacent thereto and transmits traffic after setting communication session. In this way, since D2D communication may solve traffic overload by distributing traffic concentrated into the base station, the D2D communication may have received attention as the element technology of the next generation mobile communication technology after 4G. For this reason, the standard institute such as 3GPP or IEEE has proceeded to establish the D2D communication standard on the basis of LTE-A or Wi-Fi, and Qualcomm has developed their own D2D communication technology.

It is expected that the D2D communication contributes to increase throughput of a mobile communication system and create new communication services. Also, the D2D communication may support proximity based social network services or network game services. The problem of link of a user equipment located at a shade zone may be solved by using a D2D link as a relay. In this way, it is expected that the D2D technology will provide new services in various fields.

The D2D communication technologies such as infrared communication, ZigBee, radio frequency identification (RFID) and near field communications (NFC) based on the RFID have been already used. However, since these technologies support communication only of a specific object within a limited distance (about 1 m), it is difficult for the technologies to be regarded as the D2D communication technologies strictly.

Although the D2D communication has been described as above, details of a method for transmitting data from a plurality of D2D user equipments with the same resource have not been suggested.

SUMMARY OF THE INVENTION

The object of the present invention can be achieved by providing a method for operating by an apparatus in wireless communication system, the method comprising; the method comprising: receiving a PDCP (Packet Data Convergence Protocol) SDU (Service Data Unit) when the UE is configured to communicate with one or more other UEs directly; deciding whether to apply ciphering or not for the received PDCP SDU; generating a PDCP data PDU (Protocol Data Unit) including the received PDCP SDU and a PDCP PDU header including one or more fields for ciphering parameters; and transmitting the PDCP data PDU to the one or more other UEs over PC5 interface, wherein at least one of the one or more fields for ciphering parameters is set to a fixed value when the ciphering is not applied for the received PDCP SDU, and wherein the one or more field for ciphering parameters are set to values used for ciphering of the PDCP SDU when the ciphering is applied for the received PDCP SDU.

In another aspect of the present invention provided herein is a method for operating by an apparatus in wireless communication system, the method comprising: receiving a PDCP (Packet Data Convergence Protocol) SDU (Service Data Unit) when the UE is configured to communicate with one or more other UEs directly; deciding whether to apply ciphering or not for the received PDCP SDU; generating a PDCP data PDU including an indicator indicating the PDCP data PDU is ciphered and parameters used for the ciphering if the ciphering is applied for the received PDCP SDU.

Preferably, the method further comprises: generating the PDCP data PDU including an indicator indicating the PDCP data PDU is not ciphered but doesn't include the parameters used for the ciphering if the ciphering is not applied for the received PDCP SDU.

Preferably, the indicator is a Ciphering Indicator (CIND).

Preferably, the indicator is a SDU type field.

In another aspect of the present invention provided herein is a method for operating by an apparatus in wireless communication system, the method comprising: receiving a PDCP (Packet Data Convergence Protocol) data PDU (Protocol Data Unit) from a peer UE over PC5 interface, wherein the PDCP data PDU includes a PDCP SDU (Service Data Unit) and a PDCP PDU header including one or more fields for ciphering parameters; and determining whether to apply deciphering or not for the PDCP data PDU according to values in the one or more fields for ciphering parameters; reassembling the PDCP SDU from the PDCP data PDU without deciphering the PDCP data PDU if the one or more fields for ciphering parameters is set to a fixed value; and reassembling the PDCP SDU from the PDCP data PDU after deciphering the PDCP data PDU if the one or more field for ciphering parameters are set to values different from the fixed value.

In another aspect of the present invention provided herein is a method for operating by an apparatus in wireless communication system, the method comprising: receiving a PDCP (Packet Data Convergence Protocol) data PDU (Protocol Data Unit) from a peer UE over PC5 interface, wherein the PDCP data PDU includes an indicator indicating the PDCP data PDU is ciphered or not; and determining whether to apply deciphering or not for the PDCP data PDU according to the indicator; reassembling the PDCP SDU from the PDCP data PDU after deciphering the PDCP data PDU by using ciphering parameters include in the PDCP data PDU if the indicator indicates the PDCP data PDU is ciphered.

Preferably, the method further comprises: reassembling the PDCP SDU from the PDCP data PDU without deciphering the PDCP data PDU if the indicator indicates the PDCP data PDU is not ciphered, wherein the PDCP data PDU doesn't includes the ciphering parameters.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention.

FIG. 3 is a diagram showing a control plane and a user plane of a radio interface protocol between a UE and an E-UTRAN based on a 3rd generation partnership project (3GPP) radio access network standard;

FIG. 17 is a format of PDCP Data PDU format for SLRB.

FIGS. 19A and 19B are examples for indicating a ciphering indication for a sidelink radio bearer according to embodiments of the present invention;

FIGS. 20A and 20B are examples for indicating a ciphering indication for a sidelink radio bearer according to embodiments of the present invention;

FIG. 21 is a diagram for indicating a ciphering indication for a sidelink radio bearer according to embodiments of the present invention; and FIGS. 22A and 22B are examples for indicating a ciphering indication for a sidelink radio bearer according to embodiments of the present invention.

DETAILED DESCRIPTION OF THE INVENTION

Universal mobile telecommunications system (UMTS) is a 3rd Generation (3G) asynchronous mobile communication system operating in wideband code division multiple access (WCDMA) based on European systems, global system for mobile communications (GSM) and general packet radio services (GPRS). The long-term evolution (LTE) of UMTS is under discussion by the 3rd generation partnership project (3GPP) that standardized UMTS.

The 3GPP LTE is a technology for enabling high-speed packet communications. Many schemes have been proposed for the LTE objective including those that aim to reduce user and provider costs, improve service quality, and expand and improve coverage and system capacity. The 3G LTE requires reduced cost per bit, increased service availability, flexible use of a frequency band, a simple structure, an open interface, and adequate power consumption of a terminal as an upper-level requirement.

Hereinafter, structures, operations, and other features of the present invention will be readily understood from the embodiments of the present invention, examples of which are illustrated in the accompanying drawings. Embodiments described later are examples in which technical features of the present invention are applied to a 3GPP system.

Although the embodiments of the present invention are described using a long term evolution (LTE) system and a LTE-advanced (LTE-A) system in the present specification, they are purely exemplary. Therefore, the embodiments of the present invention are applicable to any other communication system corresponding to the above definition. In addition, although the embodiments of the present invention are described based on a frequency division duplex (FDD) scheme in the present specification, the embodiments of the present invention may be easily modified and applied to a half-duplex FDD (H-FDD) scheme or a time division duplex (TDD) scheme.

Figure 1:
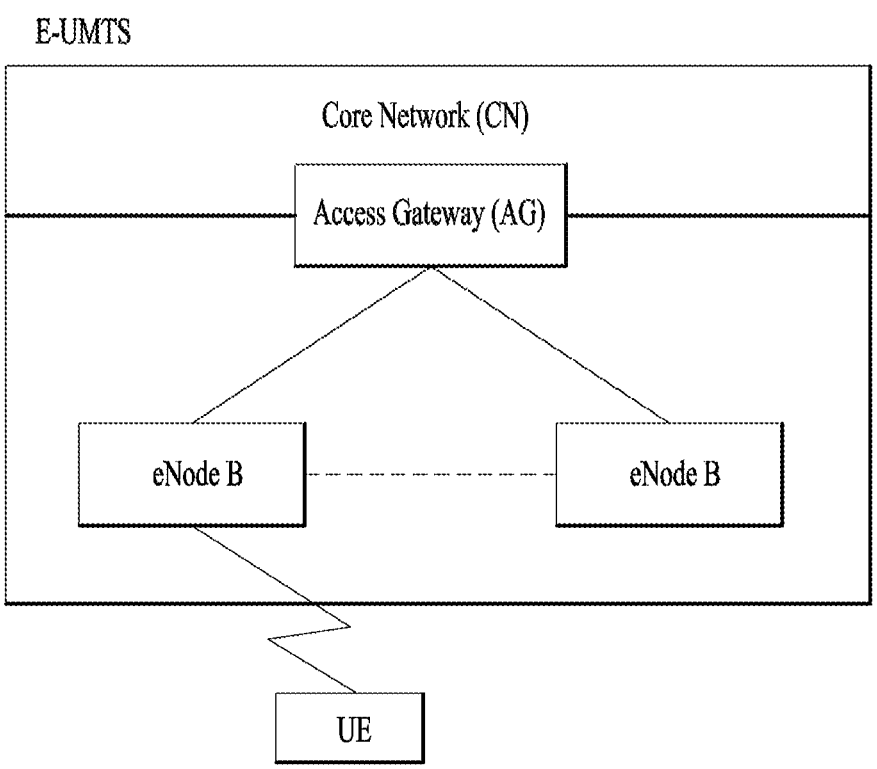
FIG. 1 is a diagram showing a network structure of an Evolved Universal Mobile Telecommunications System (E-UMTS) as an example of a wireless communication system.
Figure 2A:
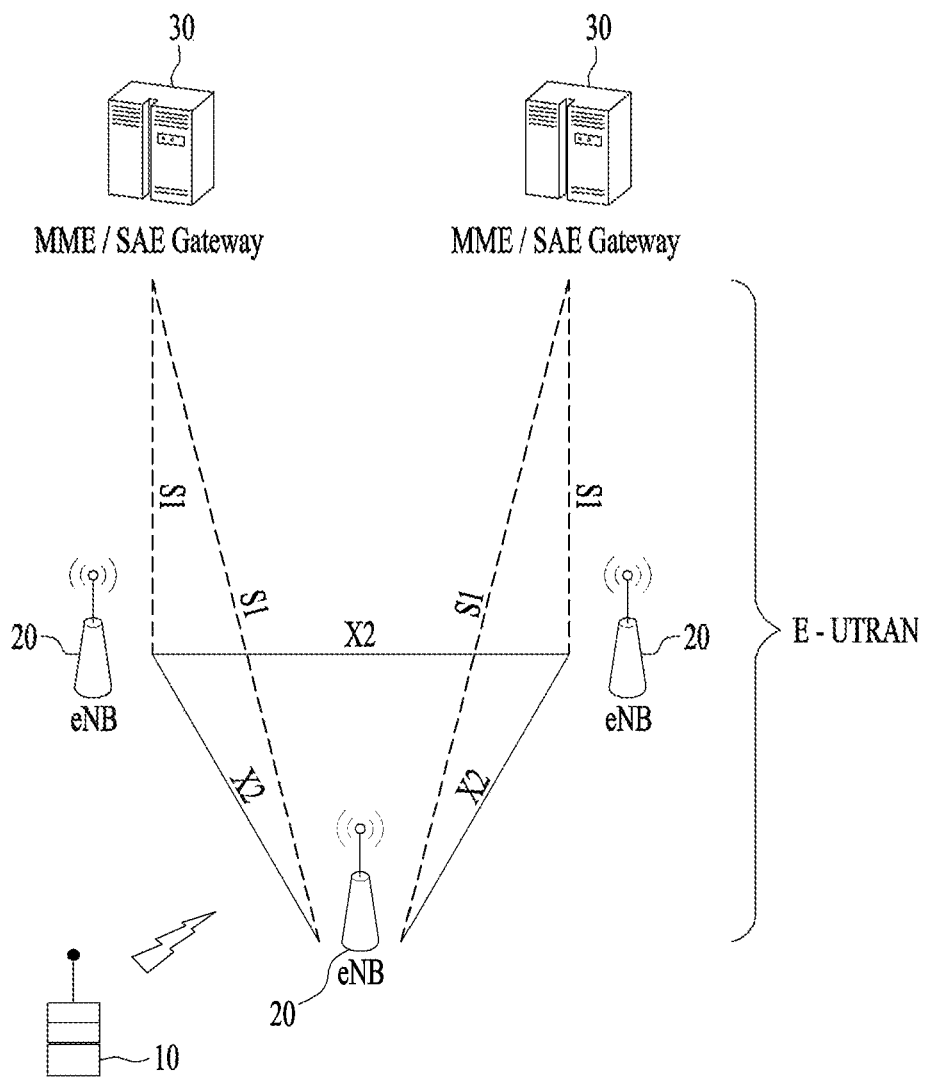
FIG. 2A is a block diagram illustrating network structure of an evolved universal mobile telecommunication system (E-UMTS)

FIG. 2A is a block diagram illustrating network structure of an evolved universal mobile telecommunication system (E-UMTS). The E-UMTS may be also referred to as an LTE system. The communication network is widely deployed to provide a variety of communication services such as voice (VoIP) through IMS and packet data.

As illustrated in FIG. 2A, the E-UMTS network includes an evolved UMTS terrestrial radio access network (E-UTRAN), an Evolved Packet Core (EPC) and one or more user equipment. The E-UTRAN may include one or more evolved NodeB (eNodeB) 20, and a plurality of user equipment (UE) 10 may be located in one cell. One or more E-UTRAN mobility management entity (MME)/system architecture evolution (SAE) gateways 30 may be positioned at the end of the network and connected to an external network.

As used herein, "downlink" refers to communication from eNodeB 20 to UE 10, and "uplink" refers to communication from the UE to an eNodeB. UE 10 refers to communication equipment carried by a user and may be also referred to as a mobile station (MS), a user terminal (UT), a subscriber station (SS) or a wireless device.

Figure 2B:
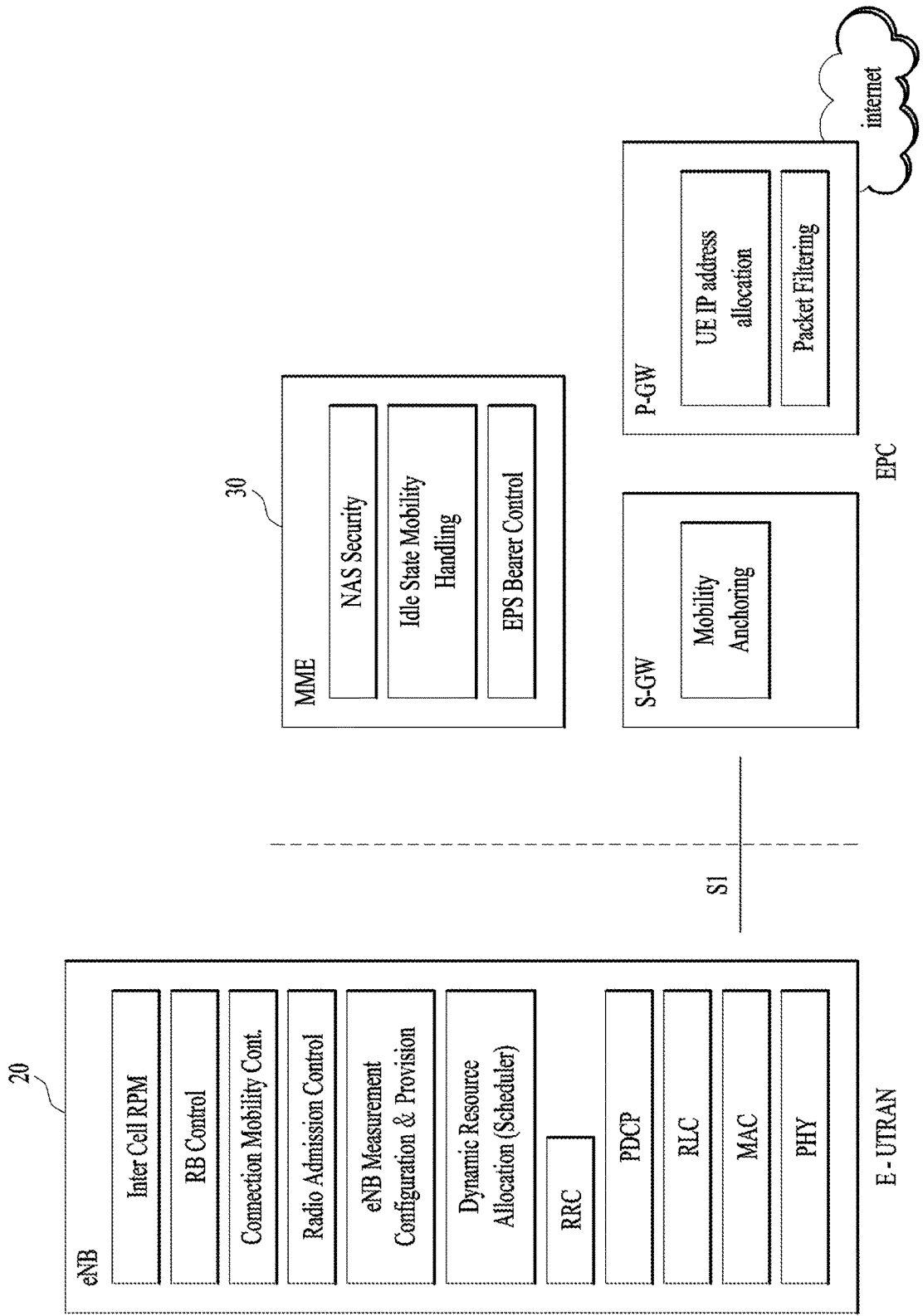
FIG. 2B is a block diagram depicting architecture of a typical E-UTRAN and a typical EPC.

FIG. 2B is a block diagram depicting architecture of a typical E-UTRAN and a typical EPC.

As illustrated in FIG. 2B, an eNodeB 20 provides end points of a user plane and a control plane to the UE 10. MME/SAE gateway 30 provides an end point of a session and mobility management function for UE 10. The eNodeB and MME/SAE gateway may be connected via an S1 interface.

The eNodeB 20 is generally a fixed station that communicates with a UE 10, and may also be referred to as a base station (BS) or an access point. One eNodeB 20 may be deployed per cell. An interface for transmitting user traffic or control traffic may be used between eNodeBs 20.

The MME provides various functions including NAS signaling to eNodeBs 20, NAS signaling security, AS Security control, Inter CN node signaling for mobility between 3GPP access networks, Idle mode UE Reachability (including control and execution of paging retransmission), Tracking Area list management (for UE in idle and active mode), PDN GW and Serving GW selection, MME selection for handovers with MME change, SGSN selection for handovers to 2G or 3G 3GPP access networks, Roaming, Authentication, Bearer management functions including dedicated bearer establishment, Support for PWS (which includes ETWS and CMAS) message transmission. The SAE gateway host provides assorted functions including Per-user based packet filtering (by e.g. deep packet inspection), Lawful Interception, UE IP address allocation, Transport level packet marking in the downlink, UL and DL service level charging, gating and rate enforcement, DL rate enforcement based on APN-AMBR. For clarity MME/SAE gateway 30 will be referred to herein simply as a "gateway," but it is understood that this entity includes both an MME and an SAE gateway.

A plurality of nodes may be connected between eNodeB 20 and gateway 30 via the S1 interface. The eNodeBs 20 may be connected to each other via an X2 interface and neighboring eNodeBs may have a meshed network structure that has the X2 interface.

As illustrated, eNodeB 20 may perform functions of selection for gateway 30, routing toward the gateway during a Radio Resource Control (RRC) activation, scheduling and transmitting of paging messages, scheduling and transmitting of Broadcast Channel (BCCH) information, dynamic allocation of resources to UEs 10 in both uplink and downlink, configuration and provisioning of eNodeB measurements, radio bearer control, radio admission control (RAC), and connection mobility control in LTE_ACTIVE state. In the EPC, and as noted above, gateway 30 may perform functions of paging origination, LTE-IDLE state management, ciphering of the user plane, System Architecture Evolution (SAE) bearer control, and ciphering and integrity protection of Non-Access Stratum (NAS) signaling.

The EPC includes a mobility management entity (MME), a serving-gateway (S-GW), and a packet data network-gateway (PDN-GW). The MME has information about connections and capabilities of UEs, mainly for use in managing the mobility of the UEs. The S-GW is a gateway having the E-UTRAN as an end point, and the PDN-GW is a gateway having a packet data network (PDN) as an end point.

FIG. 3 is a diagram showing a control plane and a user plane of a radio interface protocol between a UE and an E-UTRAN based on a 3GPP radio access network standard. The control plane refers to a path used for transmitting control messages used for managing a call between the UE and the E-UTRAN. The user plane refers to a path used for transmitting data generated in an application layer, e.g., voice data or Internet packet data.

A physical (PHY) layer of a first layer provides an information transfer service to a higher layer using a physical channel. The PHY layer is connected to a medium access control (MAC) layer located on the higher layer via a transport channel. Data is transported between the MAC layer and the PHY layer via the transport channel. Data is transported between a physical layer of a transmitting side and a physical layer of a receiving side via physical channels. The physical channels use time and frequency as radio resources. In detail, the physical channel is modulated using an orthogonal frequency division multiple access (OFDMA) scheme in downlink and is modulated using a single carrier frequency division multiple access (SC-FDMA) scheme in uplink.

The MAC layer of a second layer provides a service to a radio link control (RLC) layer of a higher layer via a logical channel. The RLC layer of the second layer supports reliable data transmission. A function of the RLC layer may be implemented by a functional block of the MAC layer. A packet data convergence protocol (PDCP) layer of the second layer performs a header compression function to reduce unnecessary control information for efficient transmission of an Internet protocol (IP) packet such as an IP version 4 (IPv4) packet or an IP version 6 (IPv6) packet in a radio interface having a relatively small bandwidth.

A radio resource control (RRC) layer located at the bottom of a third layer is defined only in the control plane. The RRC layer controls logical channels, transport channels, and physical channels in relation to configuration, re-configuration, and release of radio bearers (RBs). An RB refers to a service that the second layer provides for data transmission between the UE and the E-UTRAN. To this end, the RRC layer of the UE and the RRC layer of the E-UTRAN exchange RRC messages with each other.

One cell of the eNB is set to operate in one of bandwidths such as 1.25, 2.5, 5, 10, 15, and 20 MHz and provides a downlink or uplink transmission service to a plurality of UEs in the bandwidth. Different cells may be set to provide different bandwidths.

Downlink transport channels for transmission of data from the E-UTRAN to the UE include a broadcast channel (BCH) for transmission of system information, a paging channel (PCH) for transmission of paging messages, and a downlink shared channel (SCH) for transmission of user traffic or control messages. Traffic or control messages of a downlink multicast or broadcast service may be transmitted through the downlink SCH and may also be transmitted through a separate downlink multicast channel (MCH).

Uplink transport channels for transmission of data from the UE to the E-UTRAN include a random access channel (RACH) for transmission of initial control messages and an uplink SCH for transmission of user traffic or control messages. Logical channels that are defined above the transport channels and mapped to the transport channels include a broadcast control channel (BCCH), a paging control channel (PCCH), a common control channel (CCCH), a multicast control channel (MCCH), and a multicast traffic channel (MTCH).

Figure 4:
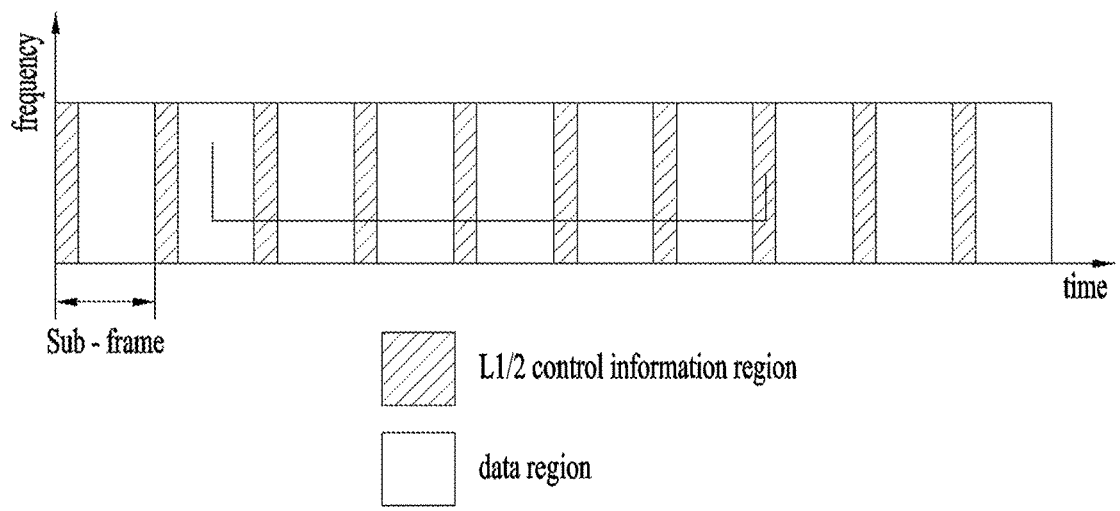
FIG. 4 is a diagram of an example physical channel structure used in an E-UMTS system.

FIG. 4 is a view showing an example of a physical channel structure used in an E-UMTS system. A physical channel includes several subframes on a time axis and several subcarriers on a frequency axis. Here, one subframe includes a plurality of symbols on the time axis. One subframe includes a plurality of resource blocks and one resource block includes a plurality of symbols and a plurality of subcarriers. In addition, each subframe may use certain subcarriers of certain symbols (e.g., a first symbol) of a subframe for a physical downlink control channel (PDCCH), that is, an L1/L2 control channel. In FIG. 4, an L1/L2 control information transmission area (PDCCH) and a data area (PDSCH) are shown. In one embodiment, a radio frame of 10 ms is used and one radio frame includes 10 subframes. In addition, one subframe includes two consecutive slots. The length of one slot may be 0.5 ms. In addition, one subframe includes a plurality of OFDM symbols and a portion (e.g., a first symbol) of the plurality of OFDM symbols may be used for transmitting the L1/L2 control information. A transmission time interval (TTI) which is a unit time for transmitting data is 1 ms.

A base station and a UE mostly transmit/receive data via a PDSCH, which is a physical channel, using a DL-SCH which is a transmission channel, except a certain control signal or certain service data. Information indicating to which UE (one or a plurality of UEs) PDSCH data is transmitted and how the UE receive and decode PDSCH data is transmitted in a state of being included in the PDCCH.

For example, in one embodiment, a certain PDCCH is CRC-masked with a radio network temporary identity (RNTI) "A" and information about data is transmitted using a radio resource "B" (e.g., a frequency location) and transmission format information "C" (e.g., a transmission block size, modulation, coding information or the like) via a certain subframe. Then, one or more UEs located in a cell monitor the PDCCH using its RNTI information. And, a specific UE with RNTI "A" reads the PDCCH and then receive the PDSCH indicated by B and C in the PDCCH information.

Figure 5:
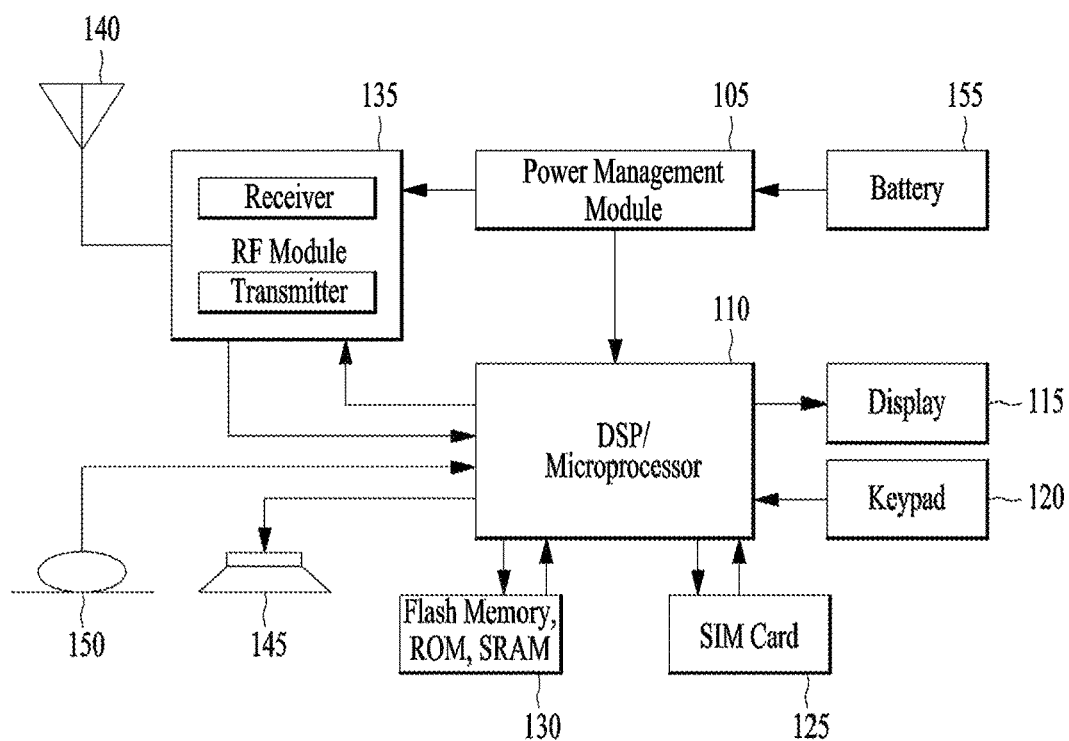
FIG. 5 is a block diagram of a communication apparatus according to an embodiment of the present invention

FIG. 5 is a block diagram of a communication apparatus according to an embodiment of the present invention.

The apparatus shown in FIG. 5 can be a user equipment (UE) and/or eNB adapted to perform the above mechanism, but it can be any apparatus for performing the same operation.

As shown in FIG. 5, the apparatus may comprises a DSP/microprocessor (110) and RF module (transmiceiver; 135). The DSP/microprocessor (110) is electrically connected with the transciver (135) and controls it. The apparatus may further include power management module (105), battery (155), display (115), keypad (120), SIM card (125), memory device (130), speaker (145) and input device (150), based on its implementation and designer's choice.

Specifically, FIG. 5 may represent a UE comprising a receiver (135) configured to receive a request message from a network, and a transmitter (135) configured to transmit the transmission or reception timing information to the network. These receiver and the transmitter can constitute the transceiver (135). The UE further comprises a processor (110) connected to the transceiver (135: receiver and transmitter).

Also, FIG. 5 may represent a network apparatus comprising a transmitter (135) configured to transmit a request message to a UE and a receiver (135) configured to receive the transmission or reception timing information from the UE. These transmitter and receiver may constitute the transceiver (135). The network further comprises a processor (110) connected to the transmitter and the receiver. This processor (110) may be configured to calculate latency based on the transmission or reception timing information.

Figure 6:
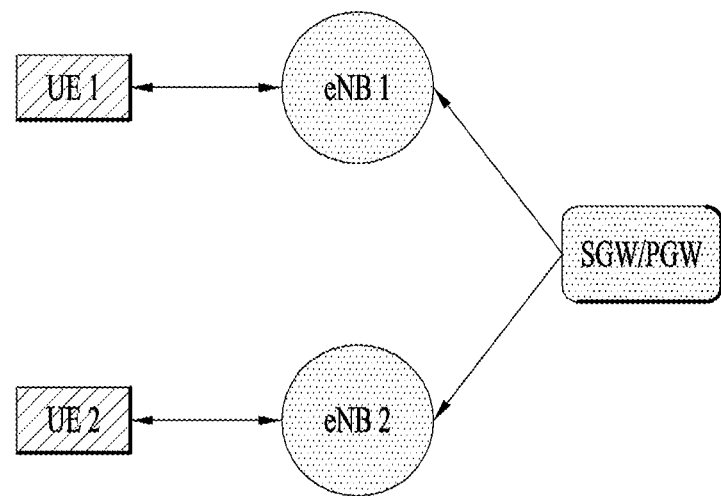
FIG. 6 is an example of default data path for a normal communication.

FIG. 6 is an example of default data path for communication between two UEs. With reference to FIG. 6, even when two UEs (e.g., UE1, UE2) in close proximity communicate with each other, their data path (user plane) goes via the operator network. Thus a typical data path for the communication involves eNB(s) and/or Gateway(s) (GW(s)) (e.g., SGW/PGW).

Figure 7:
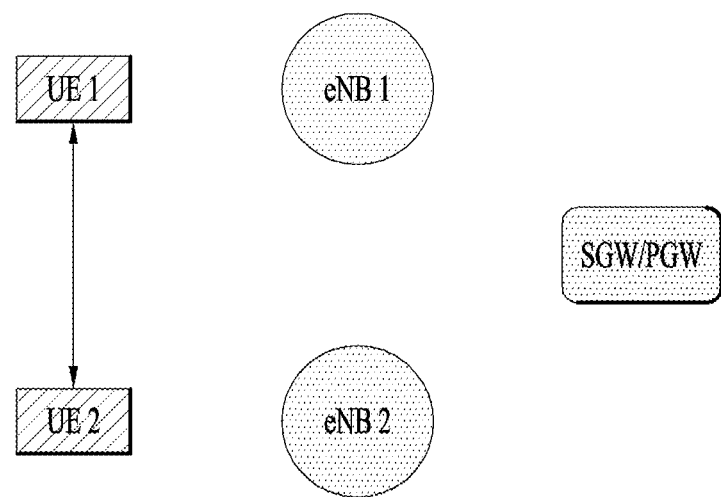
FIGS. 7 and 8 are examples of data path scenarios for a proximity communication.
Figure 8:
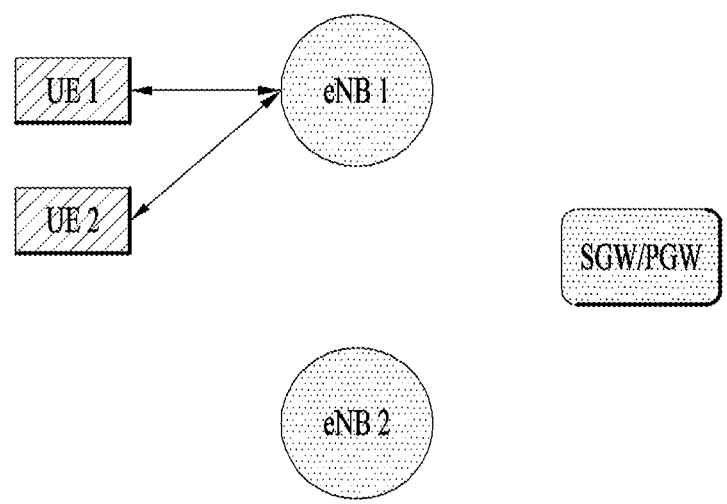

FIGS. 7 and 8 are examples of data path scenarios for a proximity communication. If wireless devices (e.g., UE1, UE2) are in proximity of each other, they may be able to use a direct mode data path (FIG. 7) or a locally routed data path (FIG. 8). In the direct mode data path, wireless devices are connected directly each other (after appropriate procedure(s), such as authentication), without eNB and SGW/PGW. In the locally routed data path, wireless devices are connected each other through eNB only.

Figure 9:
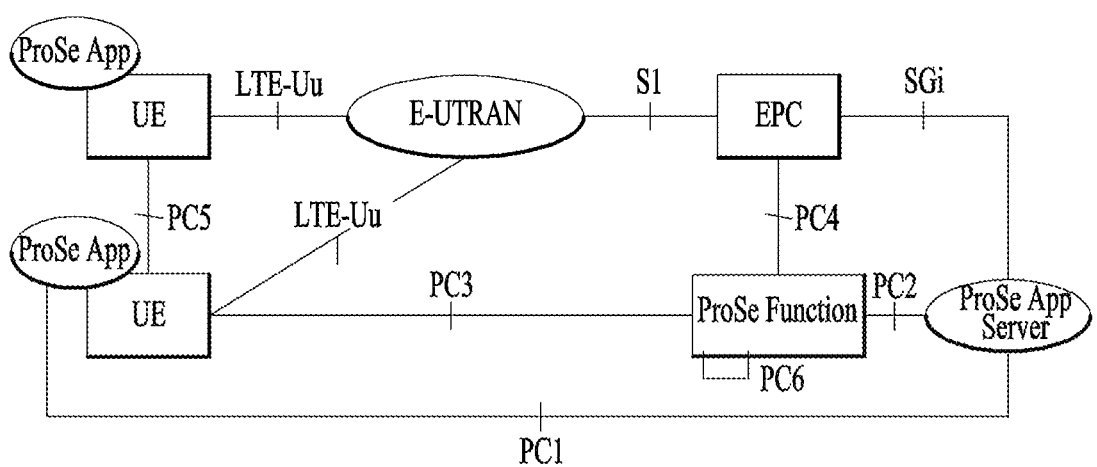
FIG. 9 is a conceptual diagram illustrating for a non-roaming reference architecture.

FIG. 9 is a conceptual diagram illustrating for a non-roaming reference architecture.

PC1 to PC5 represent interfaces. PC1 is a reference point between a ProSe application in a UE and a ProSe App server. It is used to define application level signaling requirements. PC2 is a reference point between the ProSe App Server and the ProSe Function. It is used to define the interaction between ProSe App Server and ProSe functionality provided by the 3GPP EPS via ProSe Function. One example may be for application data updates for a ProSe database in the ProSe Function. Another example may be data for use by ProSe App Server in interworking between 3GPP functionality and application data, e.g. name translation. PC3 is a reference point between the UE and ProSe Function. It is used to define the interaction between UE and ProSe Function. An example may be to use for configuration for ProSe discovery and communication. PC4 is a reference point between the EPC and ProSe Function. It is used to define the interaction between EPC and ProSe Function. Possible use cases may be when setting up a one-to-one communication path between UEs or when validating ProSe services (authorization) for session management or mobility management in real time.

PC5 is a reference point between UE to UE used for control and user plane for discovery and communication, for relay and one-to-one communication (between UEs directly and between UEs over LTE-Uu). Lastly, PC6 is a reference point may be used for functions such as ProSe Discovery between users subscribed to different PLMNs.

EPC (Evolved Packet Core) includes entities such as MME, S-GW, P-GW, PCRF, HSS etc. The EPC here represents the E-UTRAN Core Network architecture. Interfaces inside the EPC may also be impacted albeit they are not explicitly shown in FIG. 9.

Application servers, which are users of the ProSe capability for building the application functionality, e.g. in the Public Safety cases they can be specific agencies (PSAP) or in the commercial cases social media. These applications are defined outside the 3GPP architecture but there may be reference points towards 3GPP entities. The Application server can communicate towards an application in the UE.

Applications in the UE use the ProSe capability for building the application functionality. Example may be for communication between members of Public Safety groups or for social media application that requests to find buddies in proximity. The ProSe Function in the network (as part of EPS) defined by 3GPP has a reference point towards the ProSe App Server, towards the EPC and the UE.

The functionality may include but not restricted to e.g.:

Interworking via a reference point towards the 3rd party Applications

Authorization and configuration of the UE for discovery and Direct communication Enable the functionality of the EPC level ProSe discovery ProSe related new subscriber data and /handling of data storage; also handling of ProSe identities;

Security related functionality

Provide Control towards the EPC for policy related functionality

Provide functionality for charging (via or outside of EPC, e.g. offline charging)

Especially, the following identities are used for ProSe Direct Communication:

Source Layer-2 ID identifies a sender of a D2D packet at PC5 interface. The Source Layer-2 ID is used for identification of the receiver RLC UM entity;

Destination Layer-2 ID identifies a target of the D2D packet at PC5 interface. The Destination Layer-2 ID is used for filtering of packets at the MAC layer. The Destination Layer-2 ID may be a broadcast, groupcast or unicast identifier; and SA L1 ID identifier in Scheduling Assignment (SA) at PC5 interface. SA L1 ID is used for filtering of packets at the physical layer. The SA L1 ID may be a broadcast, groupcast or unicast identifier.

No Access Stratum signaling is required for group formation and to configure Source Layer-2 ID and Destination Layer-2 ID in the UE. This information is provided by higher layers.

In case of groupcast and unicast, the MAC layer will convert the higher layer ProSe ID (i.e. ProSe Layer-2 Group ID and ProSe UE ID) identifying the target (Group, UE) into two bit strings of which one can be forwarded to the physical layer and used as SA L1 ID whereas the other is used as Destination Layer-2 ID. For broadcast, L2 indicates to L1 that it is a broadcast transmission using a pre-defined SA L1 ID in the same format as for group- and unicast.

Figure 10:
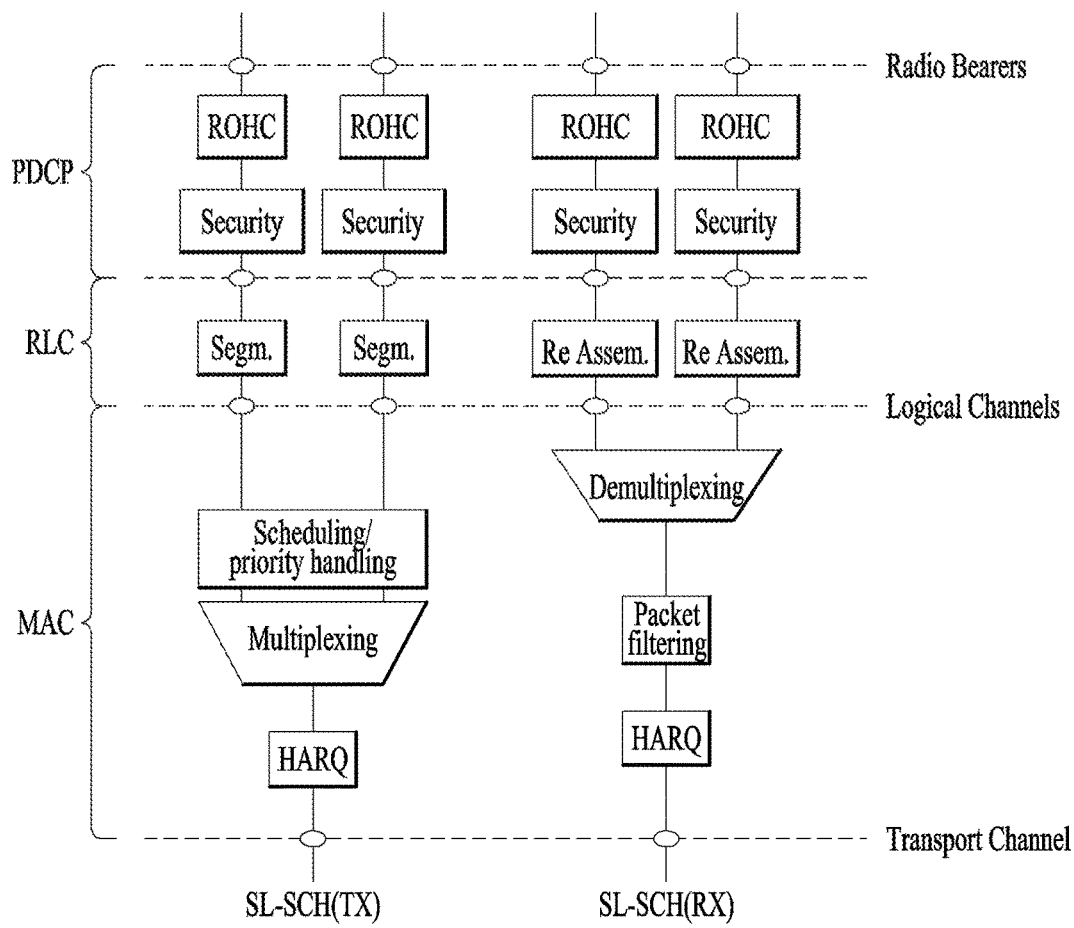
FIG. 10 is a conceptual diagram illustrating for a Layer 2 Structure for Sidelink.

FIG. 10 is a conceptual diagram illustrating for a Layer 2 structure for Sidelink.

The Sidelink is UE to UE interface for ProSe direct communication and ProSe Direct Discovery. Corresponds to the PC5 interface. The Sidelink comprises ProSe Direct Discovery and ProSe Direct Communication between UEs. The Sidelink uses uplink resources and physical channel structure similar to uplink transmissions. However, some changes, noted below, are made to the physical channels. E-UTRA defines two MAC entities; one in the UE and one in the E-UTRAN. These MAC entities handle the following transport channels additionally, i) sidelink broadcast channel (SL-BCH), ii) sidelink discovery channel (SL-DCH) and iii) sidelink shared channel (SL-SCH).

Basic transmission scheme: the Sidelink transmission uses the same basic transmission scheme as the UL transmission scheme. However, sidelink is limited to single cluster transmissions for all the sidelink physical channels. Further, sidelink uses a 1 symbol gap at the end of each sidelink sub-frame.

Physical-layer processing: the Sidelink physical layer processing of transport channels differs from UL transmission in the following steps:

i) Scrambling: for PSDCH and PSCCH, the scrambling is not UE-specific;

ii) Modulation: 64 QAM is not supported for Sidelink.

Physical Sidelink control channel: PSCCH is mapped to the Sidelink control resources. PSCCH indicates resource and other transmission parameters used by a UE for PSSCH.

Sidelink reference signals: for PSDCH, PSCCH and PSSCH demodulation, reference signals similar to uplink demodulation reference signals are transmitted in the 4th symbol of the slot in normal CP and in the 3rd symbol of the slot in extended cyclic prefix. The Sidelink demodulation reference signals sequence length equals the size (number of sub-carriers) of the assigned resource. For PSDCH and PSCCH, reference signals are created based on a fixed base sequence, cyclic shift and orthogonal cover code.

Physical channel procedure: for in-coverage operation, the power spectral density of the sidelink transmissions can be influenced by the eNB.

Figure 11A:
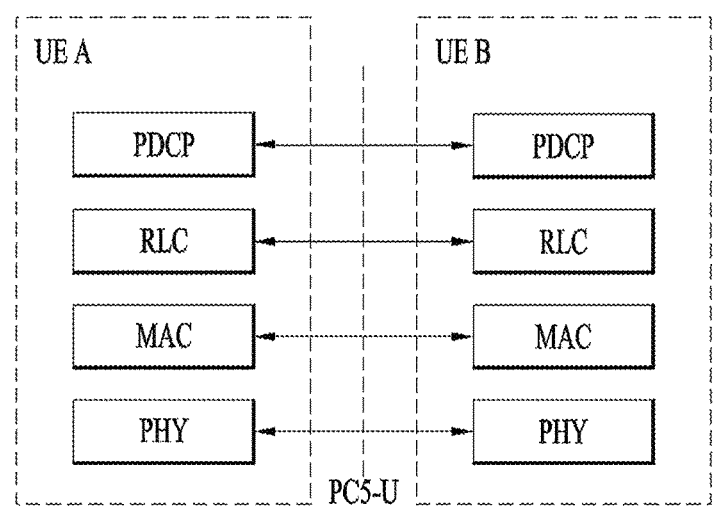
FIG. 11A is a conceptual diagram illustrating for User-Plane protocol stack for ProSe Direct Communication.
Figure 11B:
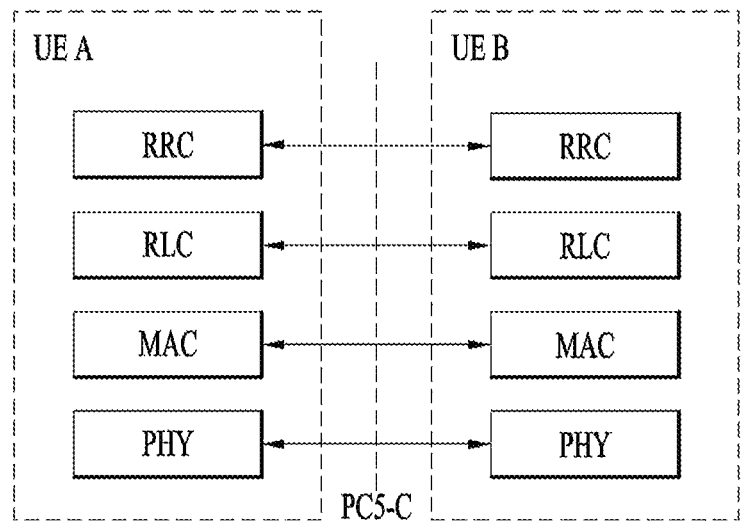
FIG. 11B is Control-Plane protocol stack for ProSe Direct Communication.

FIG. 11A is a conceptual diagram illustrating for User-Plane protocol stack for ProSe Direct Communication, and FIG. 11B is Control-Plane protocol stack for ProSe Direct Communication.

FIG. 11A shows the protocol stack for the user plane, where PDCP, RLC and MAC sublayers (terminate at the other UE) perform the functions listed for the user plane (e.g. header compression, HARQ retransmissions). The PC5 interface consists of PDCP, RLC, MAC and PHY as shown in FIG. 11A.

User plane details of ProSe Direct Communication: i) MAC sub header contains LCIDs (to differentiate multiple logical channels), ii) The MAC header comprises a Source Layer-2 ID and a Destination Layer-2 ID, iii) At MAC Multiplexing/demultiplexing, priority handling and padding are useful for ProSe Direct communication, iv) RLC UM is used for ProSe Direct communication, v) Segmentation and reassembly of RLC SDUs are performed, vi) A receiving UE needs to maintain at least one RLC UM entity per transmitting peer UE, vii) An RLC UM receiver entity does not need to be configured prior to reception of the first RLC UM data unit, and viii) U-Mode is used for header compression in PDCP for ProSe Direct Communication.

FIG. 11B shows the protocol stack for the control plane, where RRC, RLC, MAC, and PHY sublayers (terminate at the other UE) perform the functions listed for the control plane. A D2D UE does not establish and maintain a logical connection to receiving D2D UEs prior to a D2D communication.

Figure 12:
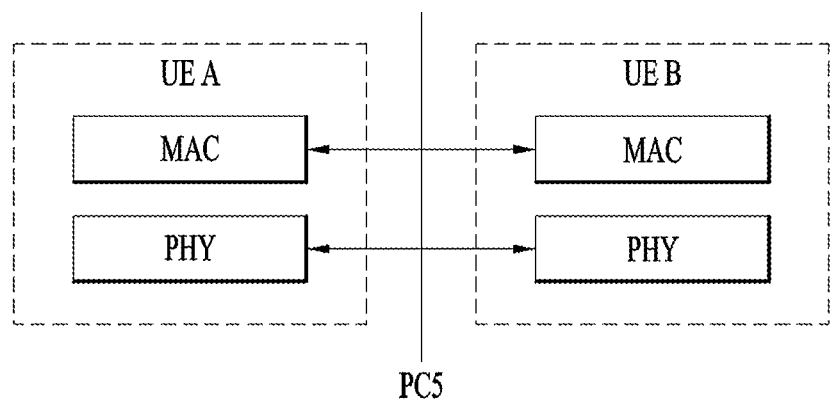
FIG. 12 is a conceptual diagram illustrating for a PC5 interface for ProSe Direct Discovery.

FIG. 12 is a conceptual diagram illustrating for a PC5 interface for ProSe Direct Discovery.

ProSe Direct Discovery is defined as the procedure used by the ProSe-enabled UE to discover other ProSe-enabled UE(s) in its proximity using E-UTRA direct radio signals via PC5.

Radio Protocol Stack (AS) for ProSe Direct Discovery is shown in FIG. 12.

The AS layer performs the following functions:

Interfaces with upper layer (ProSe Protocol): The MAC layer receives the discovery information from the upper layer (ProSe Protocol). The IP layer is not used for transmitting the discovery information.

Scheduling: The MAC layer determines the radio resource to be used for announcing the discovery information received from upper layer.

Discovery PDU generation: The MAC layer builds the MAC PDU carrying the discovery information and sends the MAC PDU to the physical layer for transmission in the determined radio resource. No MAC header is added.

There are two types of resource allocation for discovery information announcement.

Type 1: A resource allocation procedure where resources for announcing of discovery information are allocated on a non UE specific basis, further characterized by: i) The eNB provides the UE(s) with the resource pool configuration used for announcing of discovery information. The configuration may be signalled in SIB, ii) The UE autonomously selects radio resource(s) from the indicated resource pool and announce discovery information, iii) The UE can announce discovery information on a randomly selected discovery resource during each discovery period.

Type 2: A resource allocation procedure where resources for announcing of discovery information are allocated on a per UE specific basis, further characterized by: i) The UE in RRC CONNECTED may request resource(s) for announcing of discovery information from the eNB via RRC, ii) The eNB assigns resource(s) via RRC, iii) The resources are allocated within the resource pool that is configured in UEs for monitoring.

For UEs in RRC IDLE, the eNB may select one of the following options:

The eNB may provide a Type 1 resource pool for discovery information announcement in SIB. UEs that are authorized for Prose Direct Discovery use these resources for announcing discovery information in RRC_IDLE.

The eNB may indicate in SIB that it supports D2D but does not provide resources for discovery information announcement. UEs need to enter RRC Connected in order to request D2D resources for discovery information announcement.

For UEs in RRC_CONNECTED,

A UE authorized to perform ProSe Direct Discovery announcement indicates to the eNB that it wants to perform D2D discovery announcement.

The eNB validates whether the UE is authorized for ProSe Direct Discovery announcement using the UE context received from MME.

The eNB may configure the UE to use a Type 1 resource pool or dedicated Type 2 resources for discovery information announcement via dedicated RRC signaling (or no resource).

The resources allocated by the eNB are valid until a) the eNB de-configures the resource(s) by RRC signaling or b) the UE enters IDLE. (FFS whether resources may remain valid even in IDLE).

Receiving UEs in RRC_IDLE and RRC_CONNECTED monitor both Type 1 and Type 2 discovery resource pools as authorized. The eNB provides the resource pool configuration used for discovery information monitoring in SIB. The SIB may contain discovery resources used for announcing in neighbor cells as well.

Figure 13:
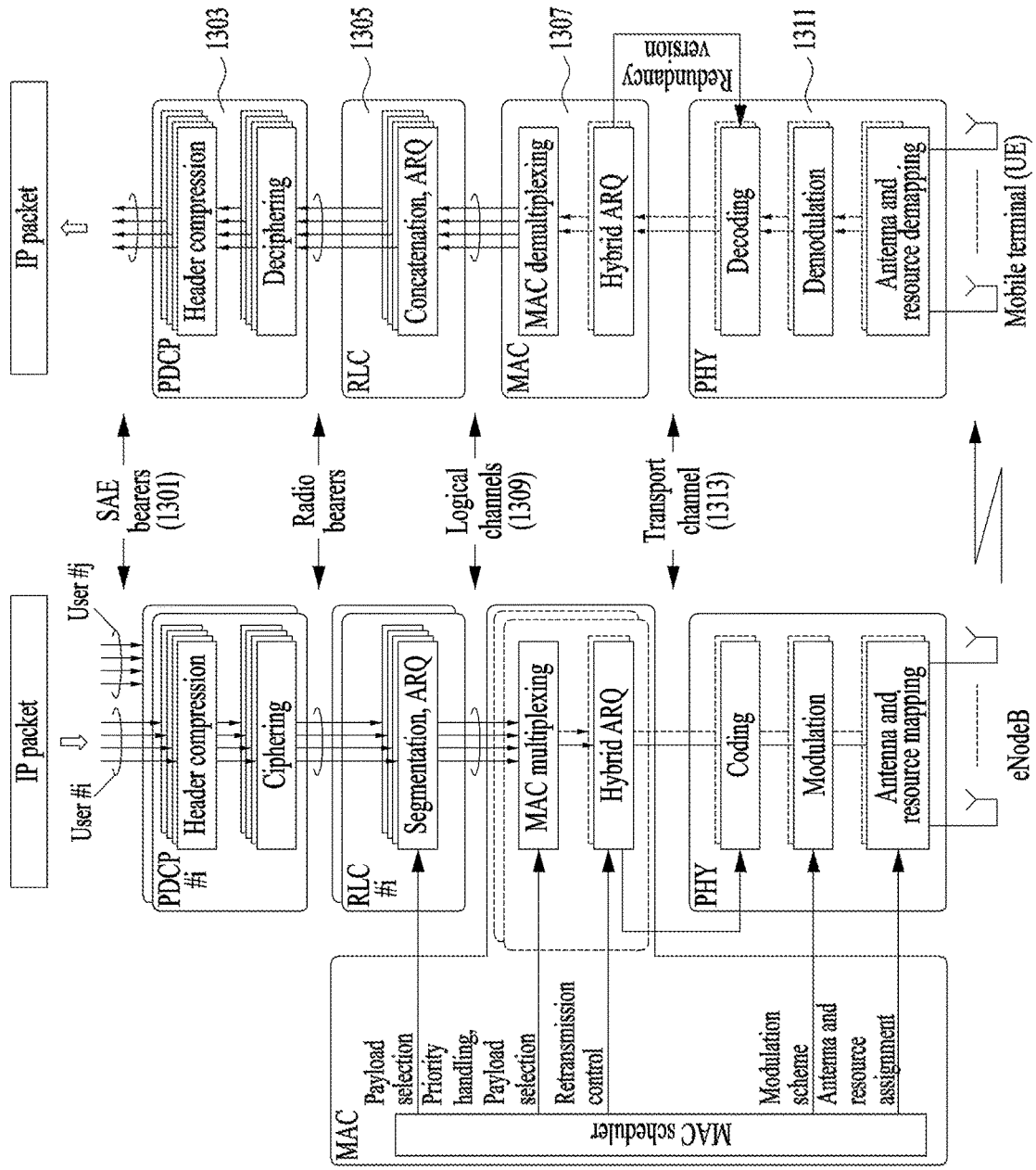
FIG. 13 is a diagram for a general overview of the LTE protocol architecture for the downlink.

FIG. 13 is a diagram for a general overview of the LTE protocol architecture for the downlink.

A general overview of the LTE protocol architecture for the downlink is illustrated in FIG. 13. Furthermore, the LTE protocol structure related to uplink transmissions is similar to the downlink structure in FIG. 13, although there are differences with respect to transport format selection and multi-antenna transmission.

Data to be transmitted in the downlink enters in the form of IP packets on one of the SAE bearers (1301). Prior to transmission over the radio interface, incoming IP packets are passed through multiple protocol entities, summarized below and described in more detail in the following sections:

\* Packet Data Convergence Protocol (PDCP, 1303) performs IP header compression to reduce the number of bits necessary to transmit over the radio interface. The header-compression mechanism is based on ROHC, a standardized header-compression algorithm used in WCDMA as well as several other mobile-communication standards. PDCP (1303) is also responsible for ciphering and integrity protection of the transmitted data. At the receiver side, the PDCP protocol performs the corresponding deciphering and decompression operations. There is one PDCP entity per radio bearer configured for a mobile terminal.

\* Radio Link Control (RLC, 1305) is responsible for segmentation/concatenation, retransmission handling, and in-sequence delivery to higher layers. Unlike WCDMA, the RLC protocol is located in the eNodeB since there is only a single type of node in the LTE radio-access-network architecture. The RLC (1305) offers services to the PDCP (1303) in the form of radio bearers. There is one RLC entity per radio bearer configured for a terminal.

There is one RLC entity per logical channel configured for a terminal, where each RLC entity is responsible for: i) segmentation, concatenation, and reassembly of RLC SDUs; ii) RLC retransmission; and iii) in-sequence delivery and duplicate detection for the corresponding logical channel.

Other noteworthy features of the RLC are: (1) the handling of varying PDU sizes; and (2) the possibility for close interaction between the hybrid-ARQ and RLC protocols. Finally, the fact that there is one RLC entity per logical channel and one hybrid-ARQ entity per component carrier implies that one RLC entity may interact with multiple hybrid-ARQ entities in the case of carrier aggregation.

The purpose of the segmentation and concatenation mechanism is to generate RLC PDUs of appropriate size from the incoming RLC SDUs. One possibility would be to define a fixed PDU size, a size that would result in a compromise. If the size were too large, it would not be possible to support the lowest data rates. Also, excessive padding would be required in some scenarios. A single small PDU size, however, would result in a high overhead from the header included with each PDU. To avoid these drawbacks, which is especially important given the very large dynamic range of data rates supported by LTE, the RLC PDU size varies dynamically.

In process of segmentation and concatenation of RLC SDUs into RLC PDUs, a header includes, among other fields, a sequence number, which is used by the reordering and retransmission mechanisms. The reassembly function at the receiver side performs the reverse operation to reassemble the SDUs from the received PDUs.

* Medium Access Control (MAC, 1307) handles hybrid-ARQ retransmissions and uplink and downlink scheduling. The scheduling functionality is located in the eNodeB, which has one MAC entity per cell, for both uplink and downlink. The hybrid-ARQ protocol part is present in both the transmitting and receiving end of the MAC protocol. The MAC (1307) offers services to the RLC (1305) in the form of logical channels (1309).

* Physical Layer (PHY, 611), handles coding/decoding, modulation/demodulation, multi-antenna mapping, and other typical physical layer functions. The physical layer (1311) offers services to the MAC layer (1307) in the form of transport channels (1313).

Figure 14:
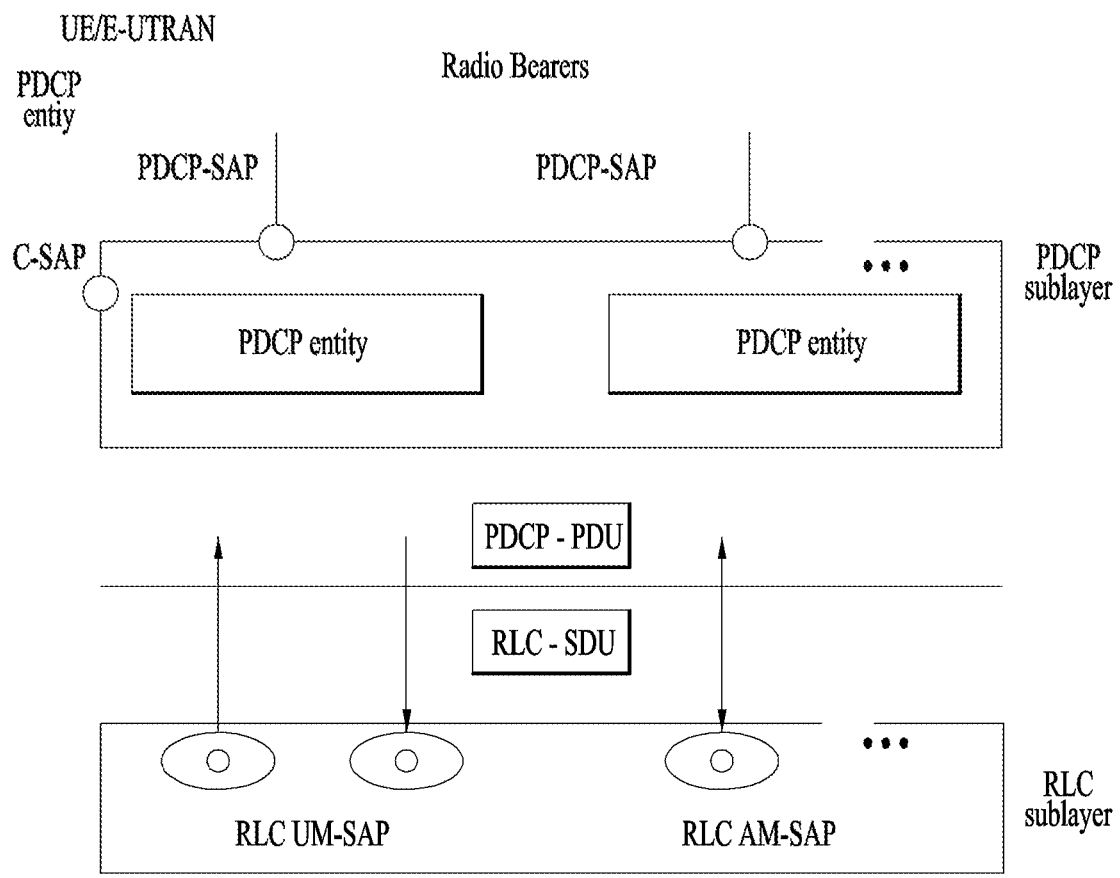
FIG. 14 is a conceptual diagram for a PDCP entity architecture.

FIG. 14 is a conceptual diagram for a PDCP entity architecture.

FIG. 14 represents one possible structure for the PDCP sublayer, but it should not restrict implementation. Each RB (i.e. DRB and SRB, except for SRB0) is associated with one PDCP entity. Each PDCP entity is associated with one or two (one for each direction) RLC entities depending on the RB characteristic (i.e. uni-directional or bi-directional) and RLC mode. The PDCP entities are located in the PDCP sublayer. The PDCP sublayer is configured by upper layers.

Figure 15:
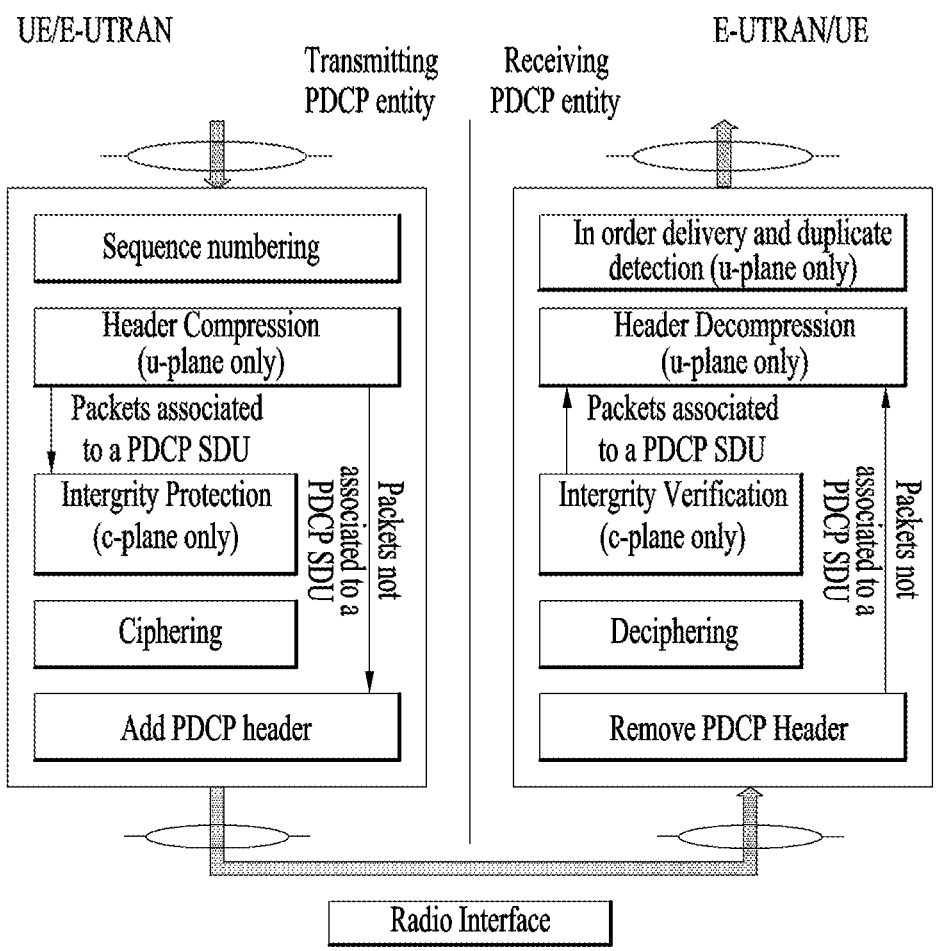
FIG. 15 is a conceptual diagram for functional view of a PDCP entity.

FIG. 15 is a conceptual diagram for functional view of a PDCP entity.

The PDCP entities are located in the PDCP sublayer. Several PDCP entities may be defined for a UE. PDCP entity uses the services provided by the RLC sublayer. PDCP is used for SRBs, DRBs, and SLRBs mapped on DCCH, DTCH, and STCH type of logical channels. PDCP is not used for any other type of logical channels.

The Packet Data Convergence Protocol supports the following functions: i) header compression and decompression of IP data flows using the ROHC protocol, ii) transfer of data (user plane or control plane), iii) maintenance of PDCP SNs, iv) in-sequence delivery of upper layer PDUs at re-establishment of lower layers, v) duplicate elimination of lower layer SDUs at re-establishment of lower layers for radio bearers mapped on RLC AM, vi) ciphering and deciphering of user plane data and control plane data, vii) integrity protection and integrity verification of control plane data, viii) for RNs, integrity protection and integrity verification of user plane data, ix) timer based discard, and x) duplicate discarding.

Figure 16A:
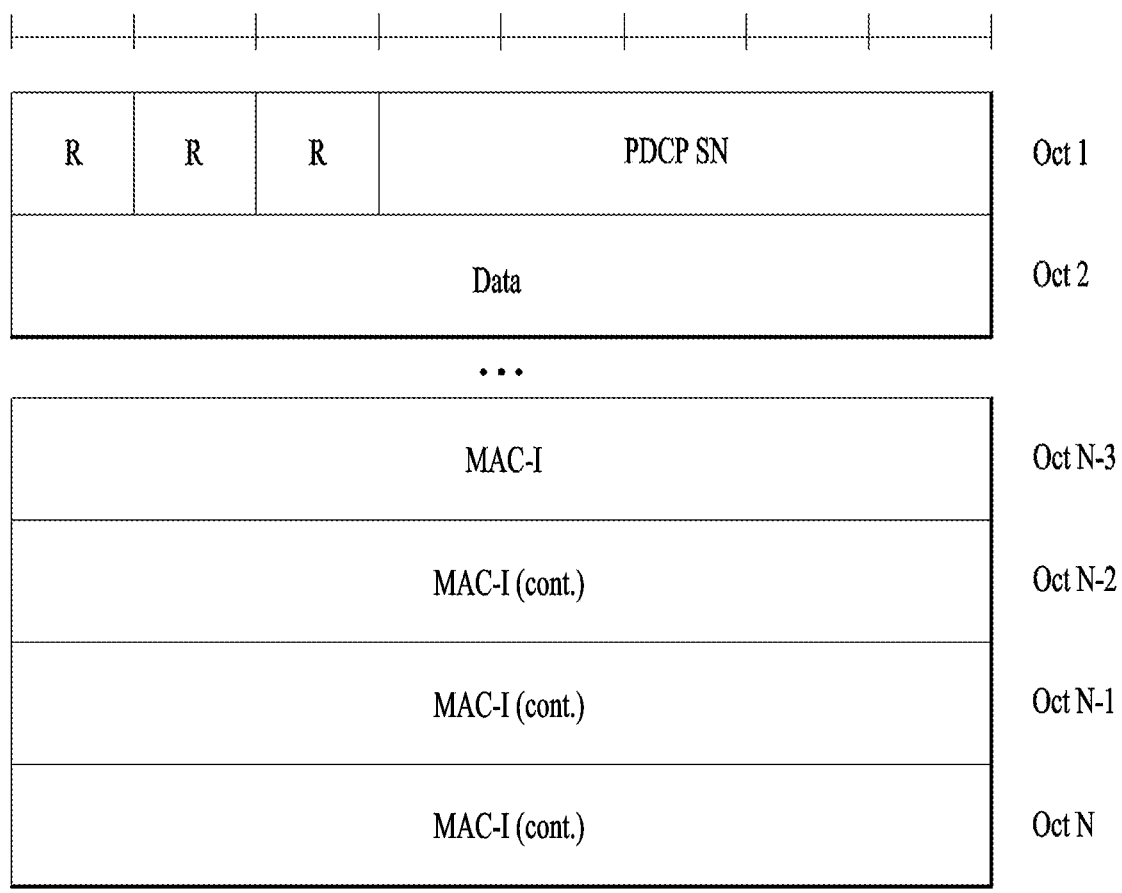
FIG. 16A is a format of the PDCP Data PDU carrying data for control plane SRBs.
Figure 16B:
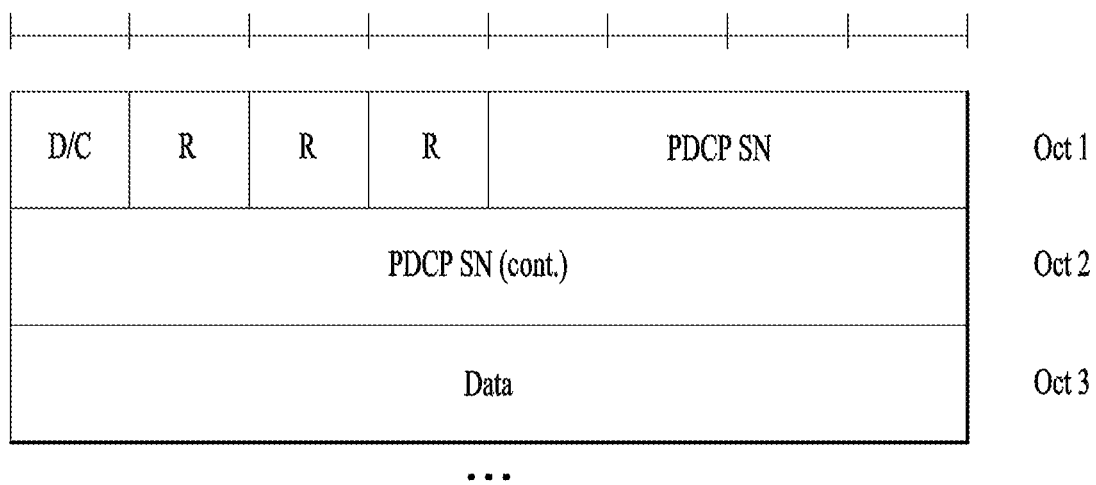
FIG. 16B is a format of the PDCP Data PDU when a 12 bit SN length is used.
Figure 16C:
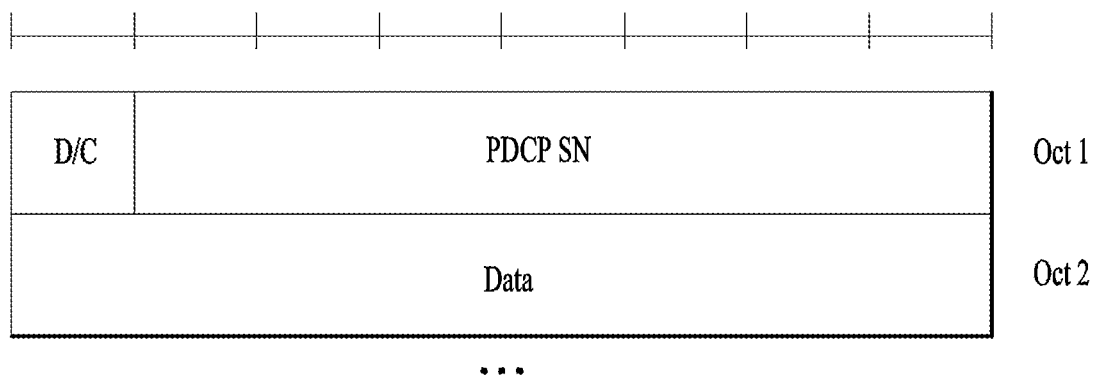
FIG. 16C is a format of the PDCP Data PDU when a 7 bit SN length is used.

FIG. 16A is a format of the PDCP Data PDU carrying data for control plane SRBs, FIG. 16B is a format of the PDCP Data PDU when a 12 bit SN length is used. This format is applicable for PDCP Data PDUs carrying data from DRBs mapped on RLC AM or RLC UM. FIG. 16C is a format of the PDCP Data PDU when a 7 bit SN length is used. This format is applicable for PDCP Data PDUs carrying data from DRBs mapped on RLC UM.

A PDCP PDU is a bit string that is byte aligned (i.e. multiple of 8 bits) in length. Bit strings are represented by tables in which the most significant bit is the leftmost bit of the first line of the table, the least significant bit is the rightmost bit on the last line of the table, and more generally the bit string is to be read from left to right and then in the reading order of the lines. The bit order of each parameter field within a PDCP PDU is represented with the first and most significant bit in the leftmost bit and the last and least significant bit in the rightmost bit.

PDCP SDUs are bit strings that are byte aligned (i.e. multiple of 8 bits) in length. A compressed or uncompressed SDU is included into a PDCP PDU from the first bit onward.

The PDCP data PDU is used to convey: i) a PDCP SDU SN, ii) user plane data containing an uncompressed PDCP SDU, iii) user plane data containing a compressed PDCP SDU, iv) control plane data, or v) a MAC-I field for SRBs.

The PDCP control PDU is used to convey: i) a PDCP status report indicating which PDCP SDUs are missing and which are not following a PDCP re-establishment, and ii) header compression control information, e.g. interspersed ROHC feedback.

The bits in parameters used in FIGS. 16A to 16C can be interpreted as follows. The left most bit string is the first and most significant and the right most bit is the last and least significant bit. Unless otherwise mentioned, integers are encoded in standard binary encoding for unsigned integers.

a) PDCP SN: length of the PDCP SN is 5, 7, 12, or 15 bits as indicated in Table 1.

TABLE 1

| Length | Description |
| --- | --- |
| 5 | SRBs |
| 7 | DRBs, if configured by upper layers (pdcp-SN-Size [3]) |
| 12 | DRBs, if configured by upper layers (pdcp-SN-Size [3]) |
| 15 | DRBs, if configured by upper layers (pdcp-SN-Size [3]) | b) Data: Data field includes uncompressed PDCP SDU (user plane data, or control plane data) or compressed PDCP SDU (user plane data only.

c) MAC-I: length of MAC-I is 32 bits. The MAC-I field carries a message authentication code calculated. For control plane data that are not integrity protected, the MAC-I field is still present and should be padded with padding bits set to 0.

d) COUNT: length of COUNT is 32 bits. For ciphering and integrity a COUNT value is maintained. The COUNT value is composed of a HFN and the PDCP SN. The length of the PDCP SN is configured by upper layers. The size of the HFN part in bits is equal to 32 minus the length of the PDCP SN e) R: length of R is 1 bit. The is bit is reserved bit set to 0. Reserved bits shall be ignored by the receiver.

FIG. 17 is a format of PDCP Data PDU format for SLRB.

For Sidelink transmission, the Tx UE may follow the procedures with following modifications: i) the requirements for maintaining Next PDCP TX SN and TX HFN are not applicable, ii) the Tx UE determines a PDCP SN ensuring that a PDCP SN value is not reused with the same key, iii) the Tx UE determines a new PTK Identity (which has not been previously used together with the same PGK and PGK Identity in the UE), and a new PTK shall be derived from the PGK key taking the new PTK Identity into use, iv) the Tx UE performs the ciphering with PEK and COUNT derived from PDCP SN, and v) the Tx UE performs the header compression only for IP PDUs.

For Sidelink reception, the UE may follow the procedures with following modifications: i) the requirements for maintaining Next_PDCP_RX_SN and RX_HFN are not applicable; ii) the Rx UE performs the deciphering with PEK and COUNT derived from received PDCP SN, and iii) the UE performs the header decompression only for IP PDUs.

FIG. 17 shows the format of the PDCP Data PDU for SLRB where a 16 bit SN length is used. The PDCP data PDU for SLRB is used to convey: a PDCP SDU SN, and PGK Index, PTK Identity, and ProSe PDU type for the SLRBs, and user plane data containing an uncompressed PDCP SDU, or user plane data containing a compressed PDCP SDU, or control plane data; and a MAC-I field for SRBs.

For ProSe, the ciphering function includes both ciphering and deciphering and is performed in PDCP. For the user plane, the data unit that is ciphered is the data part of the PDCP PDU. The ciphering algorithm and key to be used by the PDCP entity are configured by ProSe Key Management Function and the ciphering method shall be applied. The ProSe transmitting UE decides whether to enable the ciphering. If enabled, the security parameters including PGK Index, PTK Identity are included in the header of PDCP PDU.

Since the transmitting UE is responsible for security, if the transmitting UE enables ciphering and does not inform the receiving UE, the receiving UE cannot know which PDCP Data PDU format is used in the transmitting UE, i.e., ciphering is enabled or not.

Figure 18:
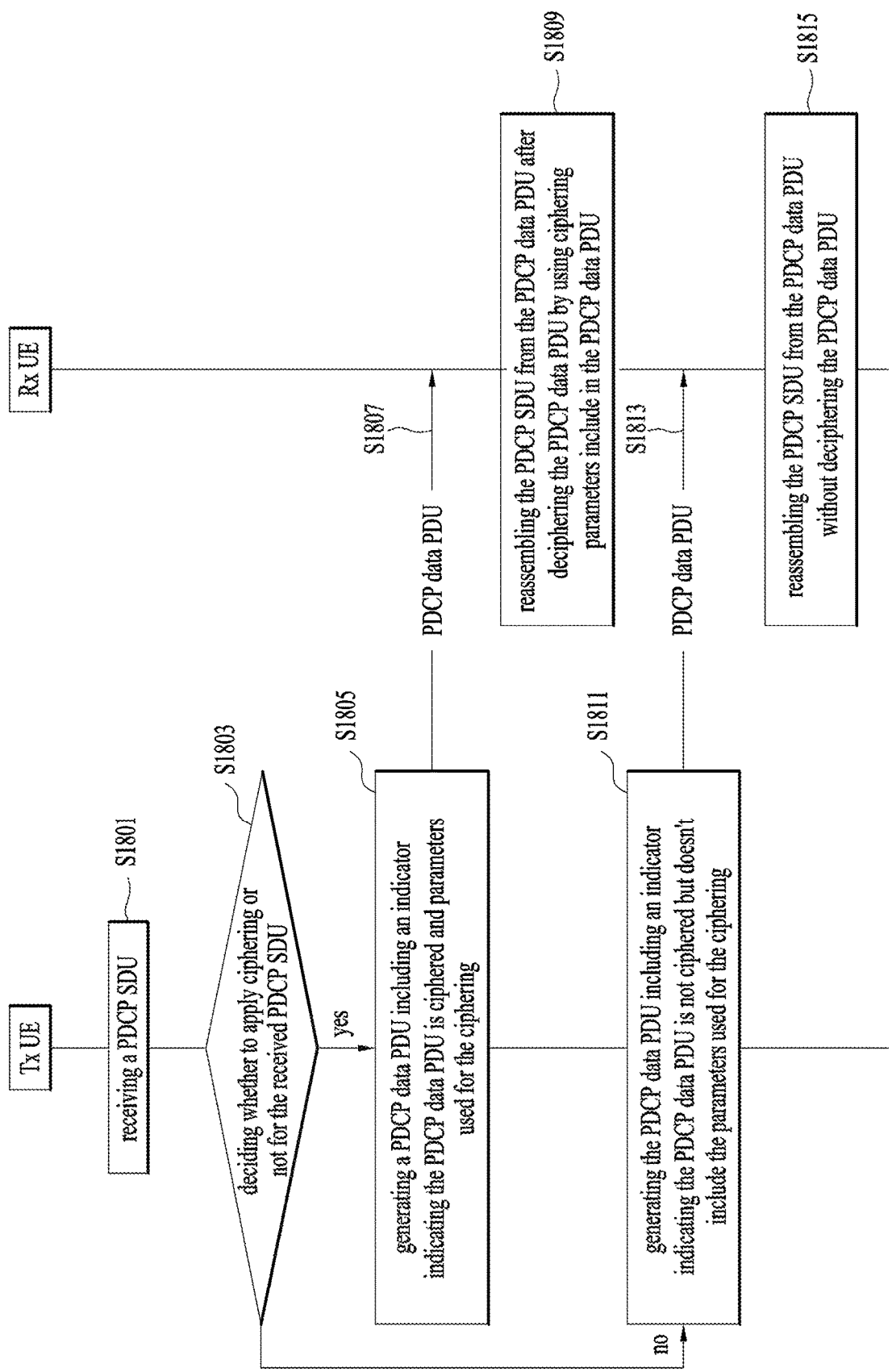
FIG. 18 is a diagram for indicating a ciphering indication for a sidelink radio bearer according to embodiments of the present invention.

FIG. 18 is a diagram for indicating a ciphering indication for a sidelink radio bearer according to embodiments of the present invention.

It is invented that a ciphering indicator is included in each PDCP data PDU transmitted in PC5 interface (SLRB). The ciphering indicator in the PDCP data PDU indicates whether the ciphering is applied to the corresponding PDCP data PDU or not.

When the TX UE receives a PDCP SDU (S1801) from an upper layer, the TX UE decides whether to apply ciphering or not for the received PDCP SDU (S1803).

If the TX UE decides to apply ciphering for the received PDCP SDU, the UE generates a PDCP data PDU including an indicator indicating that the PDCP data PDU is ciphered and parameters used for the ciphering (S1805). If the ciphering is applied for the received PDCP SDU, the TX UE performs ciphering of the PDCP SDU and generates a PDCP data PDU using Format A including ciphered PDCP SDU.

Preferably, the parameters used for the ciphering is PGK index, PTK identity, PDCP SN, and so on.

After the step of S1805, the TX UE transmits the generated PDCP data PDU using Format A to a RX UE via PC5 interface (S1807).

When the RX UE receives a PDCP data PDU using Format A from the TX UE via PC5 interface, the RX UE identifies whether ciphering is applied or not to the PDCP SDU in the received PDCP data PDU based on a ciphering indicator included in the received PDCP data PDU.

Preferably, the ciphering indicator can be used by a Ciphering Indicator (CIND) field, or a SDU type field.

When the indicator is a CIND filed, the TX UE sets a value of the CIND field to 0 if ciphering is not applied to the data, and 1 if ciphering is applied to the data, vice versa.

When the indicator is a SDU type field, the TX UE sets value of the SDU type to Table 2 or Table 3:

TABLE 2

| Bit | Description |
| --- | --- |
| 000 | IP, ciphering is not applied |
| 001 | IP, ciphering is applied |
| 010 | ARP, ciphering is not applied |
| 011 | ARP, ciphering is applied |
| 100-111 | reserved |

TABLE 3

| Bit | Description |
| --- | --- |
| 000 | IP, header compression is not applied, ciphering is not applied |
| 001 | IP, header compression is applied, ciphering is not applied |
| 010 | IP, header compression is not applied, ciphering is applied |
| 011 | IP, header compression is applied, ciphering is applied |
| 100 | ARP, ciphering is applied |
| 101 | ARP, ciphering is not applied |
| 110-111 | reserved |

If the ciphering indicator indicates that the ciphering is applied to the PDCP SDU included in the received PDCP data PDU (i.e. a value of the CNID field is 1 or a value of the SDU type field is 001 or 011 of Table 2), the RX UE parses the received PDCP data PDU assuming Format A, and reassembles the PDCP SDU from the PDCP data PDU after deciphering the PDCP data PDU by using ciphering parameters include in the PDCP data PDU (S1809). Because the RX UE cannot know whether the PDCP data PDU is used by the Format A or another Format, the RX UE assumes the received PDCP data PDU is used by the Format A if the ciphering indicator indicates that the ciphering is applied to the PDCP SDU included in the received PDCP data PDU.

Meanwhile, if the TX UE decides not to apply ciphering for the received PDCP SDU, the UE generates a PDCP data PDU including an indicator indicating the PDCP data PDU is not ciphered but doesn't include the parameters used for the ciphering (S1811). If the ciphering is not applied for the received PDCP SDU, the TX UE doesn't perform ciphering of the PDCP SDU and generates a PDCP data PDU using Format B including unciphered PDCP SDU.

After the step of S1811, the TX UE transmits the generated PDCP Data PDU using Format B to the RX UE via PC5 interface (S1813). If the ciphering indicator indicates that the ciphering is not applied to the PDCP SDU included in the received PDCP data PDU (i.e. CNID is 0 or SDU type field is 000, or 010 of Table 2), the RX UE parses the received PDCP data PDU assuming Format B, and reassembles the PDCP SDU from the PDCP data PDU without deciphering the PDCP data PDU (S1815).

After the step of S1809 or S1815, the RX UE delivers the reassembled PDCP SDU to the ProSe upper layer.

FIGS. 19A and 19B are examples for indicating a ciphering indication for a sidelink radio bearer according to embodiments of the present invention, and FIGS. 20A and 20B are examples for ciphering indication for a sidelink radio bearer according to embodiments of the present invention.

FIGS. 19A and 19B show examples for PDCP data PDU using a CIND field as the ciphering indicator. FIG. 19A is an example of the Format A and FIG. 19B is an example of the Format B.

FIGS. 20A and 20B show examples for PDCP data PDU using a SDU type field as the ciphering indicator. FIG. 20A is an example of the Format A and FIG. 20B is an example of the Format B.

FIG. 21 is a diagram for indicating a ciphering indication for a sidelink radio bearer according to embodiments of the present invention.

In this case, the TX UE uses parameters for ciphering instead of the ciphering indicator. When the TX UE receives a PDCP SDU (S2101), the TX UE decides whether to apply ciphering or not for the received PDCP SDU (S2103).

When the TX UE generates PDCP data PDU including the received PDCP SDU and a PDCP PDU header including one or more fields for ciphering parameters, if the TX UE decides to apply ciphering for the received PDCP SDU, the one or more field for ciphering parameters are set to values used for ciphering of the PDCP SDU (S2105).

If the ciphering is applied for the received PDCP SDU, the TX UE performs ciphering of the PDCP SDU and generates a PDCP data PDU including ciphered PDCP SDU, wherein the one or more field for ciphering parameters are set to values used for ciphering of the PDCP SDU.

After the step of S2105, the TX UE transmits the generated PDCP data PDU to the RX UE via PC5 interface (S2107).

When the RX UE receives a PDCP data PDU from the TX UE over PC5 interface, the RX UE reassembles the PDCP SDU from the PDCP data PDU after deciphering the PDCP data PDU if the one or more field for ciphering parameters are set to values different from a fixed value (S2109).

Preferably, the one or more field for ciphering parameters can be PGK index, PTK identity, PDCP SN, and so on.

Preferably, the fixed value is '0 (zero)'.

Meanwhile, when the TX UE generates PDCP data PDU including the received PDCP SDU and a PDCP PDU header including one or more fields for ciphering parameters, if the TX UE decides not to apply ciphering for the received PDCP SDU, the one or more field for ciphering parameters are set to the fixed value (S2111).

If the ciphering is not applied for the received PDCP SDU, the TX UE doesn't perform ciphering of the PDCP SDU and generates a PDCP Data PDU including deciphered PDCP SDU, wherein the one or more field for ciphering parameters are set to the fixed value.

Preferably, the one or more field for ciphering parameters can be PGK index, PTK identity, PDCP SN, and so on.

Preferably, the fixed value is '0 (zero)'.

After the step of S2111, the TX UE transmits the generated PDCP data PDU to the RX UE via PC5 interface (S2113).

When the RX UE receives a PDCP data PDU from the TX UE over PC5 interface, the RX UE reassembles the PDCP SDU from the PDCP data PDU without deciphering the PDCP data PDU if the one or more fields for ciphering parameters is set to the fixed value (S2115).

After the step of S2109 or S2115, the RX UE delivers the reassembled PDCP SDU to the ProSe upper layer.

FIGS. 22A and 22B are examples for indicating a ciphering indication for a sidelink radio bearer according to embodiments of the present invention.

FIG. 22A shows an example of PDCP data PDU including one or more field for ciphering parameters are set to values different from a fixed value, and FIG. 22B shows an example of PDCP data PDU including one or more field for ciphering parameters are set to the fixed value. For example, if ciphering is not configured, PGK Index, PTK Identity, and PDCP SN can be set to "0" in the PDCP PDU header. Or, if ciphering is configured, PGK Index, PTK Identity, and PDCP SN can be set to "0" in the PDCP PDU header.

Table 4 indicates cases of length of PDCP SN. The length of PDCP SN is 5, 7, 12, 15 or 16 bits. For SLRB, if ciphering is applied to the data, the TX UE sets PDCP SN to 16. For example, if ciphering is not applied to the data, the TX UE sets PGK Index and PTK Index as '0'.

TABLE 4

| Length | Description |
| --- | --- |
| 5 | SRBs |
| 7 | DRBs, if configured by upper layers (pdcp-SN-Size [3]) |
| 12 | DRBs, if configured by upper layers (pdcp-SN-Size [3]) |
| 15 | DRBs, if configured by upper layers (pdcp-SN-Size [3]) |
| 16 | SLRBs |

The embodiments of the present invention described herein below are combinations of elements and features of the present invention. The elements or features may be considered selective unless otherwise mentioned. Each element or feature may be practiced without being combined with other elements or features. Further, an embodiment of the present invention may be constructed by combining parts of the elements and/or features. Operation orders described in embodiments of the present invention may be rearranged. Some constructions of any one embodiment may be included in another embodiment and may be replaced with corresponding constructions of another embodiment. It is obvious to those skilled in the art that claims that are not explicitly cited in each other in the appended claims may be presented in combination as an embodiment of the present invention or included as a new claim by subsequent amendment after the application is filed.

In the embodiments of the present invention, a specific operation described as performed by the BS may be performed by an upper node of the BS. Namely, it is apparent that, in a network comprised of a plurality of network nodes including a BS, various operations performed for communication with an MS may be performed by the BS, or network nodes other than the BS. The term 'eNB' may be replaced with the term 'fixed station', 'Node B', 'Base Station (BS)', 'access point', etc.

The above-described embodiments may be implemented by various means, for example, by hardware, firmware, software, or a combination thereof.

In a hardware configuration, the method according to the embodiments of the present invention may be implemented by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, or microprocessors.

In a firmware or software configuration, the method according to the embodiments of the present invention may be implemented in the form of modules, procedures, functions, etc. performing the above-described functions or operations. Software code may be stored in a memory unit and executed by a processor. The memory unit may be located at the interior or exterior of the processor and may transmit and receive data to and from the processor via various known means.

Those skilled in the art will appreciate that the present invention may be carried out in other specific ways than those set forth herein without departing from the spirit and essential characteristics of the present invention. The above embodiments are therefore to be construed in all aspects as illustrative and not restrictive. The scope of the invention should be determined by the appended claims and their legal equivalents, not by the above description, and all changes coming within the meaning and equivalency range of the appended claims are intended to be embraced therein.

What is claimed is:

1. A method for transmitting, by an apparatus, data in a wireless communication system, the method comprising:
   determining whether to apply ciphering to the data;
   generating a packet data convergence protocol (PDCP) data protocol data unit (PDU) including a data part for the data and a PDCP header; and
   transmitting the PDCP data PDU,
   wherein a PGK index field and a PTK identity field of the PDCP header are set to 0 based on the ciphering for the data not being applied, and
   wherein a PDCP Sequence Number (SN) field of the PDCP header is further set to a fixed value such that all elements of the PDCP SN field have the same binary value based on the data being data for a sidelink radio bearer.

2. The method according to claim 1, wherein the data for the sidelink radio bearer is transmitted over a PC5 interface.

3. The method according to claim 1, wherein the PDCP SN field, the PGK index field and the PTK identity field have a fixed size irrespective of whether the ciphering is applied to the data.

4. A method according to claim 1, wherein the PDCP SN field comprises two octets where all elements of the PDCP SN field have the same binary value based on the ciphering not being applied to the data for the sidelink radio bearer.

5. A method for receiving, by an apparatus, data in a wireless communication system, the method comprising:
   receiving a packet data convergence protocol (PDCP) data protocol data unit (PDU) including a data part for the data and a PDCP header;
   determining a value included in fields for ciphering parameters; and
   obtaining the data from the PDCP data PDU, wherein the data is obtained from the PDCP data PDU without deciphering the data part of PDCP data PDU based on the data being a data for sidelink radio bearer, a PGK index field and a PTK identity field of the PDCP header being set to 0, and a PDCP Sequence Number (SN) field of the PDCP header having a fixed value such that all elements of the PDCP SN field have the same binary value.

6. The method according to claim 5, wherein the data for the sidelink radio bearer is received over a PC5 interface.

7. A method according to claim 5, wherein the PDCP SN field comprises two octets where all elements of the PDCP SN field have the same binary value based on the ciphering not being applied to the data for the sidelink radio bearer.

8. An apparatus for a wireless communication system, the apparatus comprising:
   a processor; and
   a memory that is operably connectable to the processor and that has stored thereon instructions which, when executed, cause the processor to perform operations comprising:
   determining whether to apply ciphering to data;
   generating a packet data convergence protocol (PDCP) data protocol data unit (PDU) including a data part for the data and a PDCP header, and
   transmitting the PDCP data PDU,
   wherein the operations comprise:
   setting a PGK index field and a PTK identity field of the PDCP header to 0 based on the ciphering for the data not being applied; and
   setting the PDCP SN field to have a fixed value such that all elements of the PDCP SN field have the same binary value based on the data being a data for a sidelink radio bearer.

9. The apparatus according to claim 8, wherein the data for the sidelink radio bearer is transmitted over a PC5 interface.

10. The apparatus according to claim 8, wherein the PDCP SN field, the PGK index field and the PTK identity field have a fixed size irrespective of whether the ciphering is applied to the data.

11. An apparatus according to claim 8, wherein the PDCP SN field comprises two octets where all elements of the PDCP SN field have the same binary value based on the ciphering not being applied to the data for the sidelink radio bearer.

12. An apparatus for a wireless communication system, the apparatus comprising:
   a processor; and
   a memory that is operably connectable to the processor and that has stored thereon instructions which, when executed, cause the processor to perform operations comprising:
   receiving a packet data convergence protocol (PDCP) data protocol data unit (PDU) including a data part for the data and a PDCP header;
   determining a value included in the PDCP SN field; and
   obtaining the data from the PDCP data PDU,
   wherein obtaining the data comprises:
   obtaining the data from the PDCP data PDU without deciphering the data part of the PDCP data PDU based on the data being a data for sidelink radio bearer, a PGK index field and a PTK identity field of the PDCP header being set to 0, and a PDCP Sequence Number (SN) having a fixed value such that all elements of the PDCP SN field have the same binary value.

13. The apparatus according to claim 12, wherein the data for the sidelink radio bearer is received over a PC5 interface.

14. An apparatus according to claim 12, wherein the PDCP SN field comprises two octets where all elements of the PDCP SN field have the same binary value based on the ciphering not being applied to the data for the sidelink radio bearer.

* * * * *